US007427041B2

(12) United States Patent
Hall et al.

(10) Patent No.: US 7,427,041 B2
(45) Date of Patent: Sep. 23, 2008

(54) PILL CRUSHER

(75) Inventors: Rick Hall, Vancouver (CA); Dan Robince, Coquitlam (CA); Chris Engst, Vancouver (CA); Chris Back, Vancouver (CA); Brian Keene, Burnaby (CA); Matt Graig, Burnaby (CA); Emie Janzen, Burnaby (CA)

(73) Assignee: Occupational Health and Safety Agency for Healthcare in British Columbia, Vancouver (CA)

( * ) Notice: Subject to any disclaimer, the term of this patent is extended or adjusted under 35 U.S.C. 154(b) by 74 days.

(21) Appl. No.: 10/979,194

(22) Filed: Nov. 3, 2004

(65) Prior Publication Data

US 2006/0088422 A1 Apr. 27, 2006

(30) Foreign Application Priority Data

Nov. 3, 2003 (CA) .................................... 2447753

(51) Int. Cl.
*A47J 42/00* (2006.01)

(52) U.S. Cl. .................................... 241/169.2; 241/168

(58) Field of Classification Search ................. 241/168, 241/169, 169.1, 169.2, DIG. 27
See application file for complete search history.

(56) References Cited

U.S. PATENT DOCUMENTS

| | | | | |
|---|---|---|---|---|
| 2,631,786 | A | | 3/1953 | Morgan et al. |
| 3,915,393 | A | | 10/1975 | Elkins |
| 4,366,930 | A | * | 1/1983 | Trombetti, Jr. .............. 241/169 |
| 4,765,549 | A | * | 8/1988 | Sherman ..................... 241/169 |
| 4,967,971 | A | * | 11/1990 | Smith ......................... 241/169 |
| 5,067,666 | A | * | 11/1991 | Sussman ...................... 241/36 |
| 5,522,556 | A | * | 6/1996 | Knepler et al. ................ 241/34 |
| 5,927,623 | A | * | 7/1999 | Ferguson et al. ............. 241/36 |
| 6,059,209 | A | | 5/2000 | Barson |
| 6,357,679 | B1 | | 3/2002 | Radke |
| 6,508,424 | B1 | | 1/2003 | Marshall |
| 6,622,949 | B1 | * | 9/2003 | Baswick et al. ............... 241/36 |
| 2006/0043225 | A1 | | 3/2006 | Peron |
| 2006/0091246 | A1 | | 5/2006 | Greenwald |

* cited by examiner

*Primary Examiner*—Faye Francis
(74) *Attorney, Agent, or Firm*—Fasken Martineau DuMoulin LLP

(57) ABSTRACT

A pill crusher has a paper cup receptacle having an upwardly open, frusto-conical recess for receiving a paper cup, a plunger having a frusto-conical shape complimentary to that of the recess, the plunger being above and coaxial with the recess, an electric motor and a reciprocating drive transmission between the electric motor and the plunger for displacing the plunger into and out of the recess. The reciprocatory drive transmission comprises a worm and nut drive transmission for rotating the plunger while displacing the plunger into the receptacle. A drive control connected to the electric motor controls the motor so as to displace the plunger into and out of the recess.

10 Claims, 29 Drawing Sheets

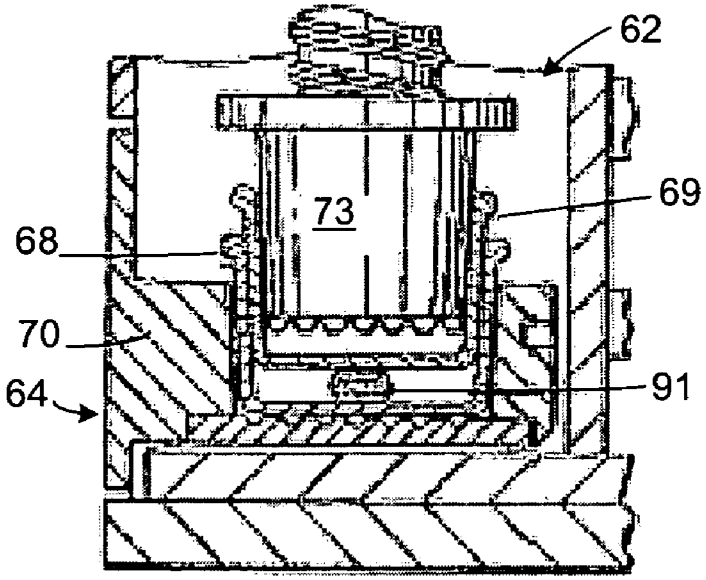
FIG. 5A(i)
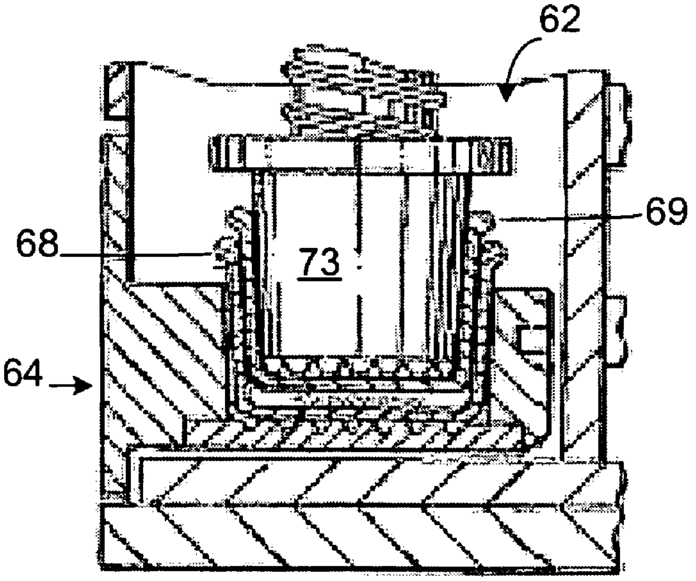
FIG. 5A(ii)

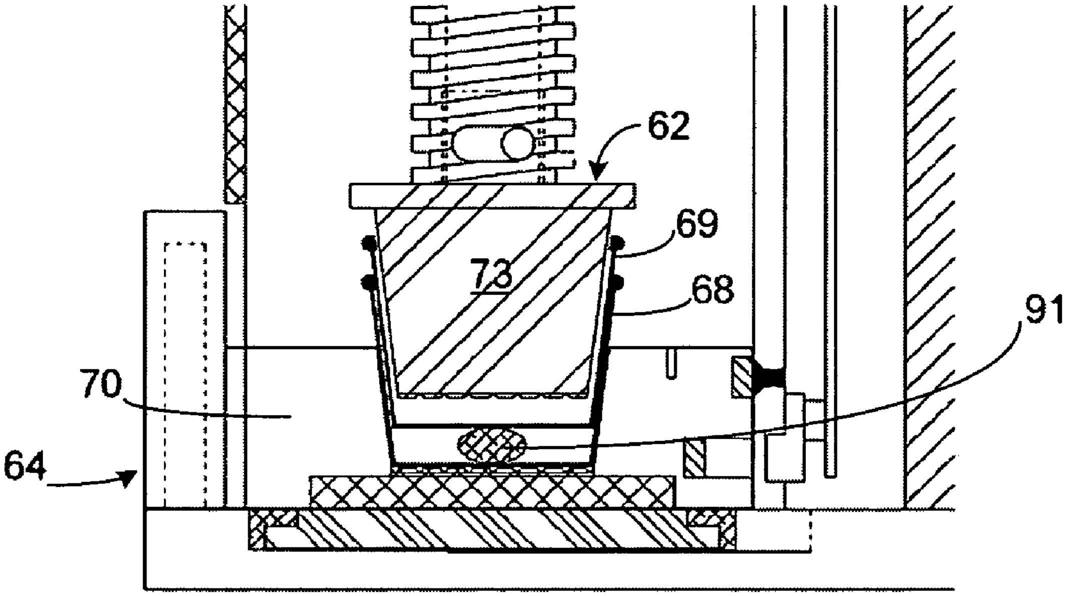
FIG. 5B(i)
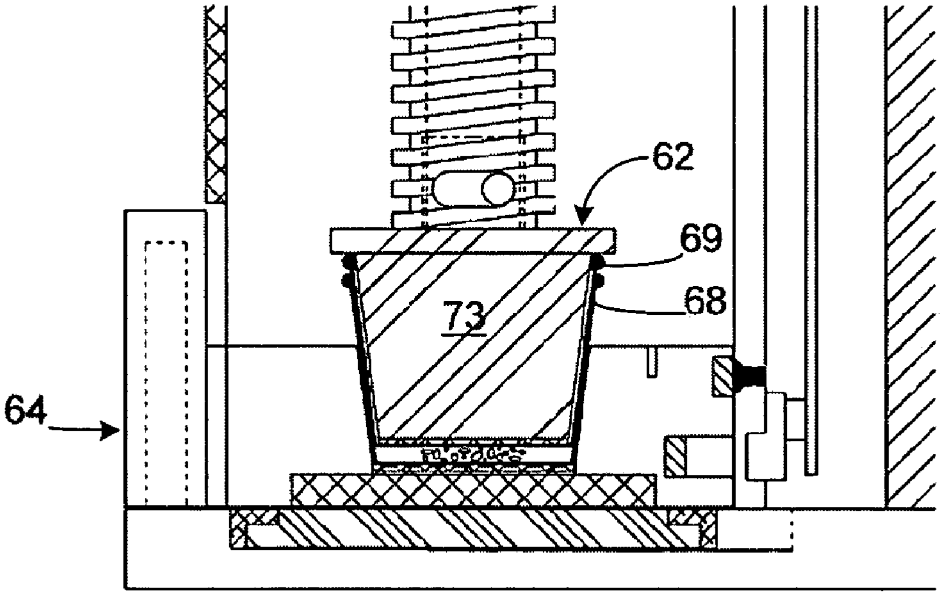
FIG. 5B(ii)

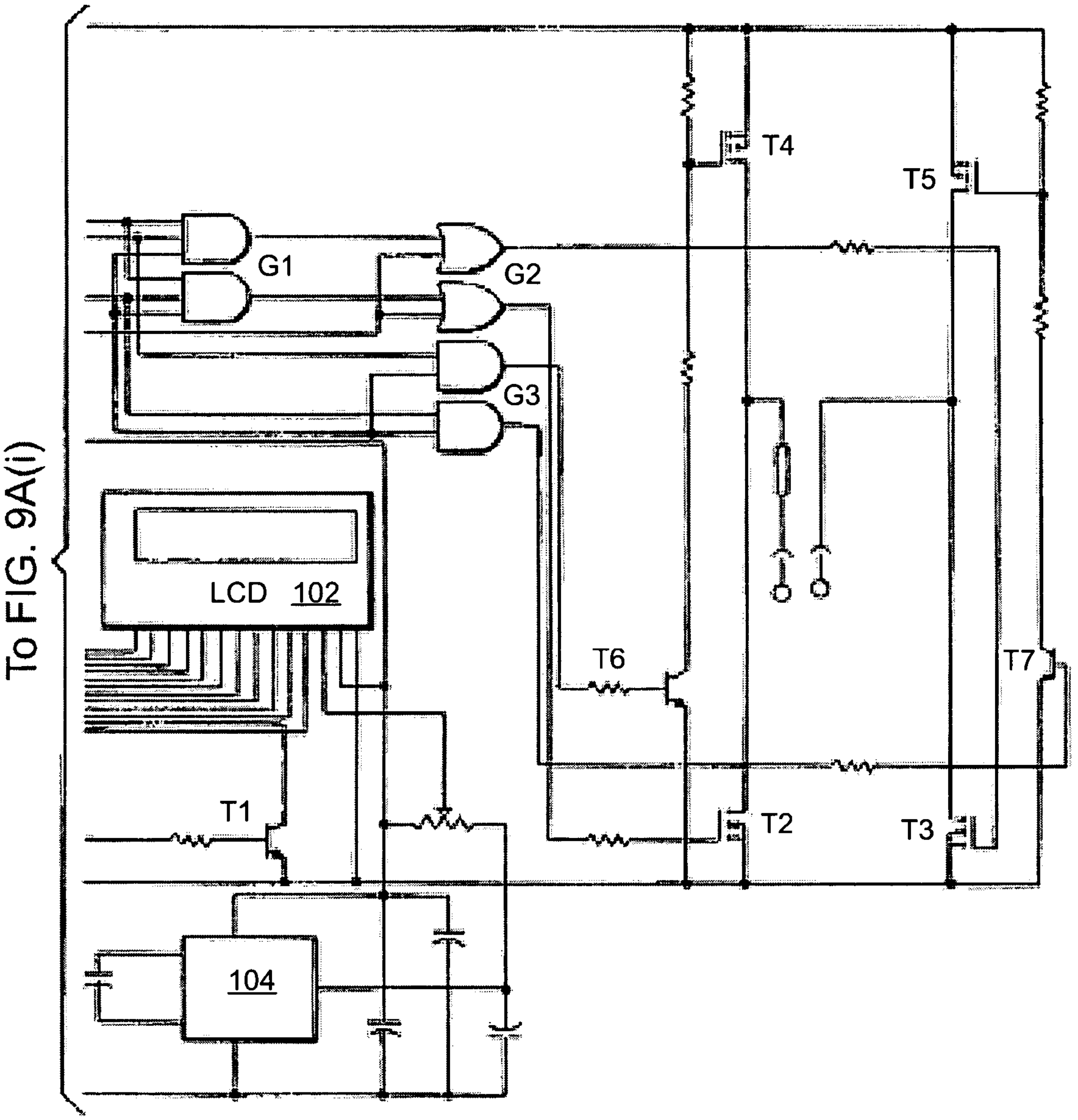
FIG. 9A(ii)

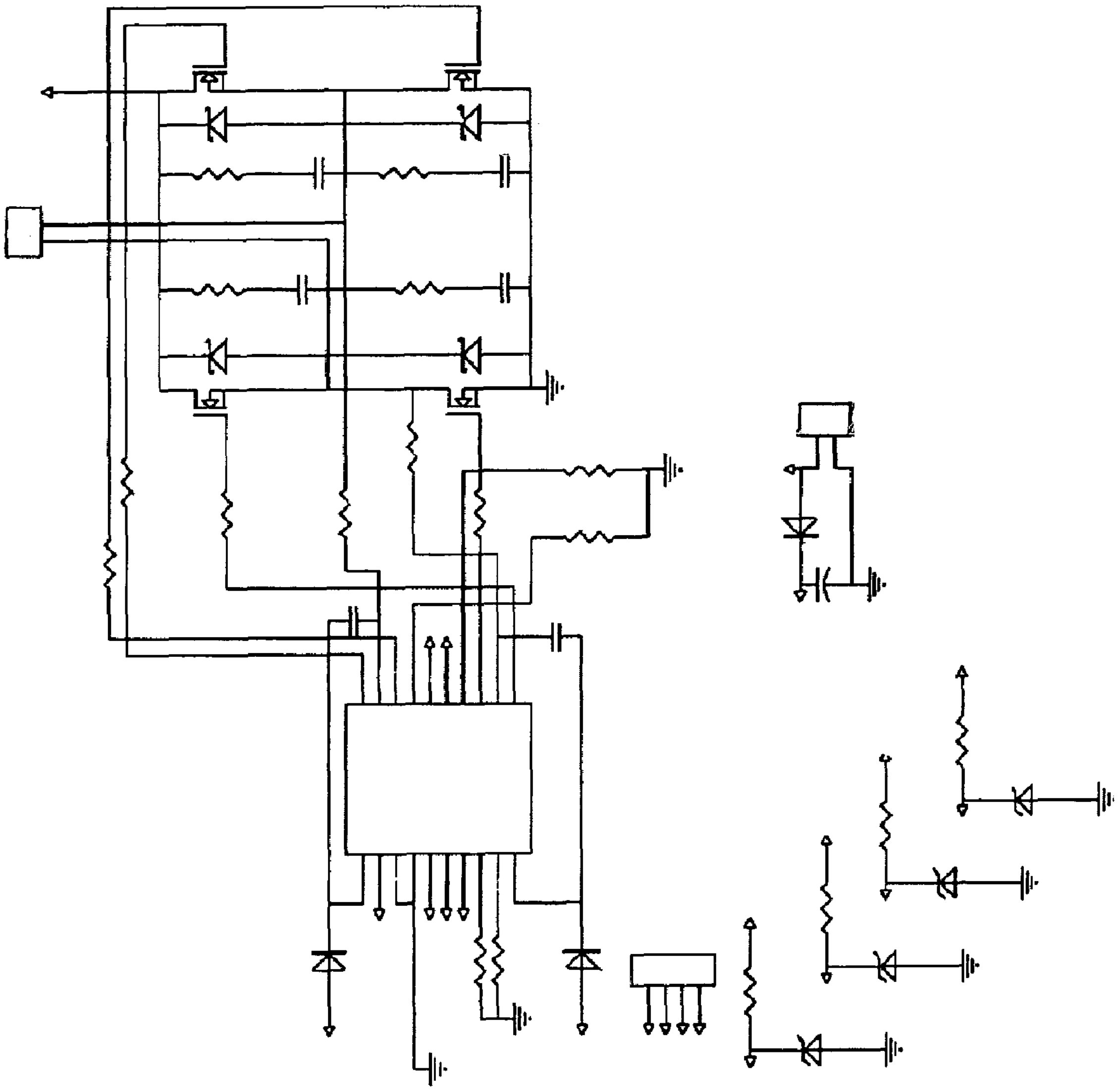
FIG. 9B(ii)

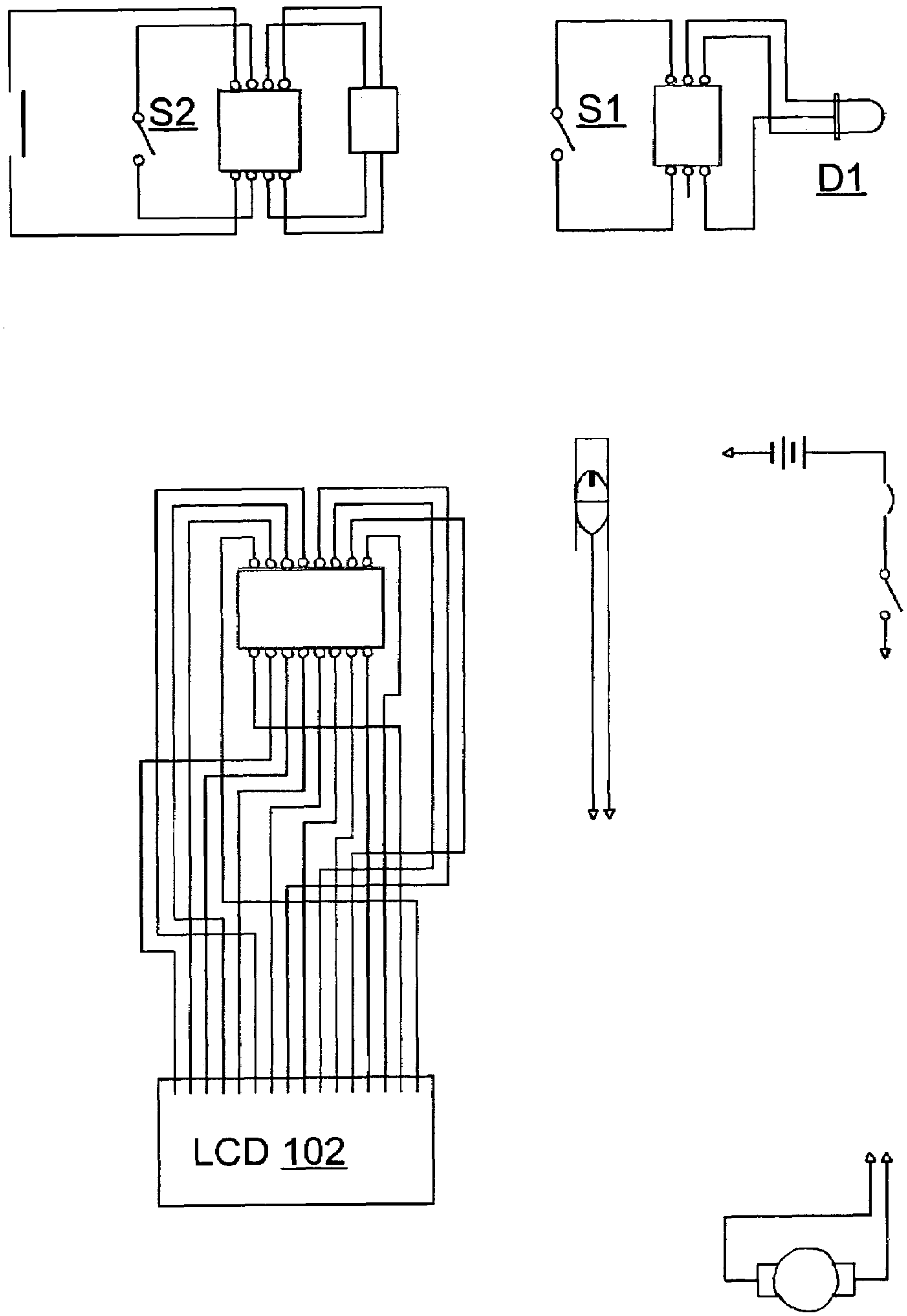
FIG. 9B(iii)

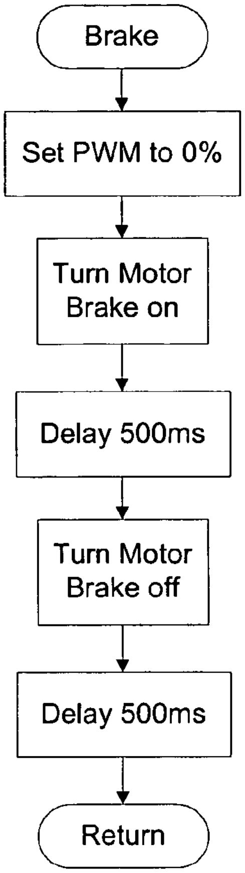
FIG.12A(i)
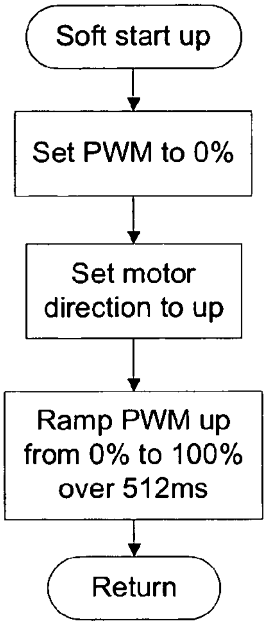
FIG.12A(ii)
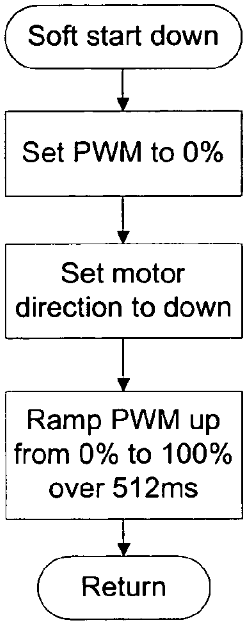
FIG.12A(iii)
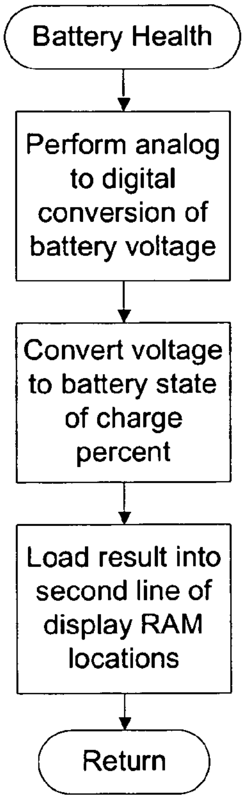
FIG.12A(iv)

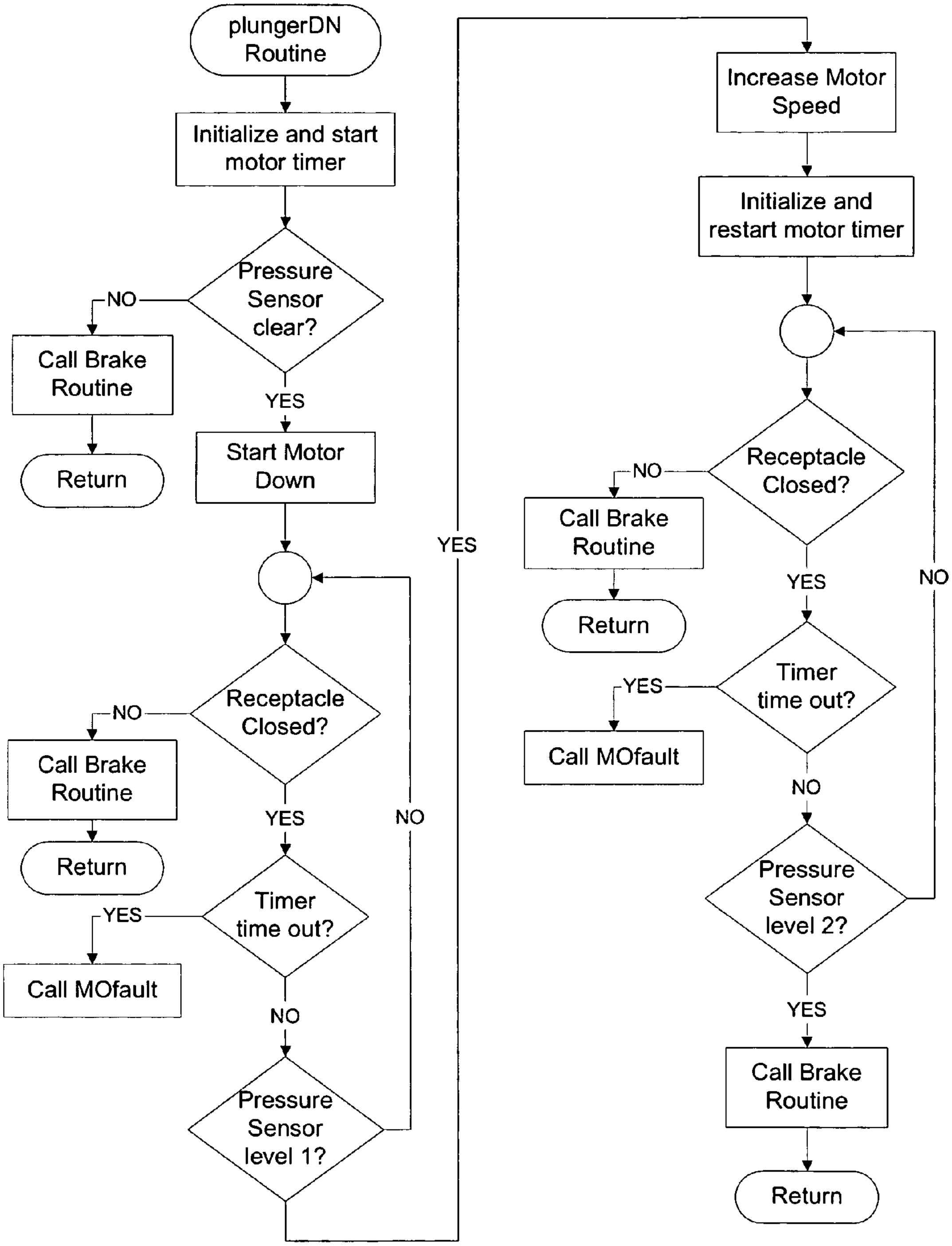
FIG. 12B(ii)

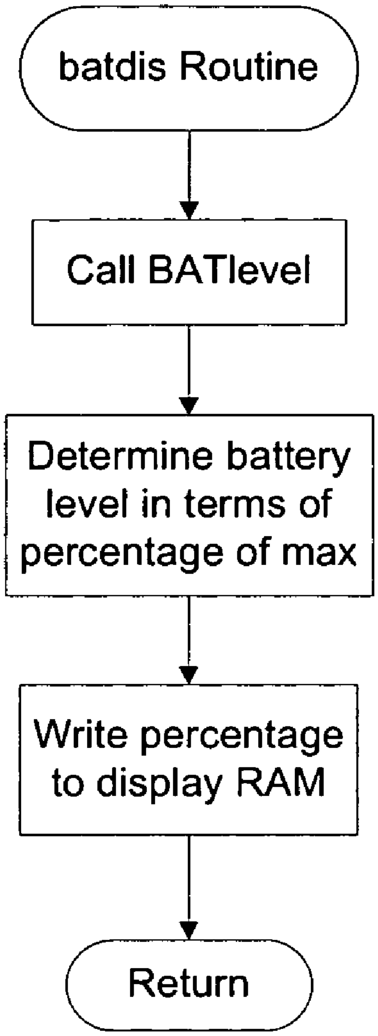
FIG. 12B(iii)
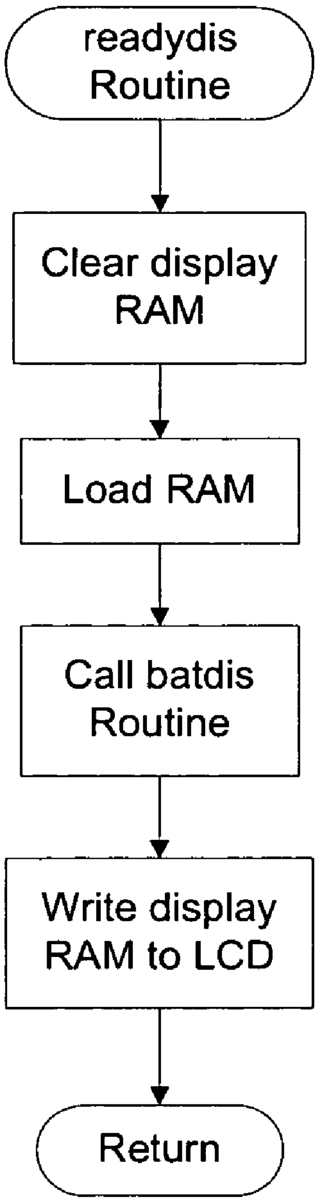
FIG. 12B(iv)

PILL CRUSHER

FIELD OF THE INVENTION

The present invention relates to pill crushers and, more particularly, to electrically operated pill crushers.

The present application claims priority from Canadian Patent Application Serial Number 2,447,753, filed Nov. 3, 2003, entitled “Pill Crushers”.

BACKGROUND OF THE INVENTION

Some patients for whom medication is provided in the form of pills, because of their poor medical conditions, have difficulty in swallowing the pills. It has therefore previously been proposed to provide a pill crusher, by means of which pills can be crushed into a powder form. The powder produced in this way can then be added to a liquid to provide a mixture which is more easily consumable by such patients.

In most healthcare facilities, crushing pills for patients is a frequently performed task. At the present time, pills are usually crushed by employing a manual pill crusher, but this frequently results in the manual exertion of high forces, or postures and repetitive movements that can contribute to injuries of the hands, wrists and shoulders. Furthermore, inhalation of airborne dust, which occurs during the crushing process, has also been reported to be a problem.

To reduce the magnitude of the forces required to crush pills, manufacturers of manual pill crushers have designed lever-type mechanical devices employing a metal head attached to a lever arm which pivots about a fulcrum.

However, even with the use of such lever-type mechanical devices, the forces required are often still high, and the users are still required to assume awkward postures and to perform repetitive movements. Awkward postures of the shoulder occur because pill crushers are typically placed on the tops of medication carts and the heights of the top surfaces of the medication carts are usually too high for most workers. The design of a typical lever-type crusher is such that downward forces are required to be exerted on a straight handle, which results in awkward postures of the wrist.

Examples of prior manually actuated pill crushers are disclosed, for example, in U.S. Pat. Nos. 2,631,786; 3,915,393; 6,059,209 and 6,357,679.

In U.S. Pat. No. 6,508,424 there is disclosed a battery operated pill crusher comprising a cylindrical plunger which can be moved downwardly into a cylindrical container, the bottom of which is in the form of a turntable which can be rotated by an electric motor and which has an upper surface formed with a plurality of grinding protrusions. In use of this prior device, a pill is inserted between the upper surface of the turntable and the plunger, the plunger is pressed downwardly and the turntable is then rotated, so that rotational motion as well as compression is applied to the pill, which is thereby pulverized. However, this prior device has the disadvantage that it is necessary to press the plunger down manually toward the turntable, which is resiliently mounted, so that the crushing forces which can be exerted on the pill are limited. Another disadvantage of this prior device is the risk that rotation of the turntable could be initiated by pressing directly onto the turntable with, for example, a finger, while the plunger is removed.

Canadian Patent Number 2,057,245 discloses a pill crusher and grinder for use especially in nursing homes and domestic environments, the pill crusher and grinder having a pill or tablet-receiving and holding means, a rotary crushing and grinding means having a rotary shaft, a tablet contacting element on one end of the shaft and rotatable therewith and means for rotating the shaft. In a preferred embodiment, the shaft is adapted firstly to break the tablet into small pieces and then to crush and grind it by rotary action within the pill receiving and holding means. The means for rotating the shaft is a manually operable handle. The rotary shaft is screw-threaded and is received in a complementary screw-threaded receiver, which is fixed with respect to the tablet receiving and holding means. However, this prior device has the disadvantage that it employs rotary blades, which can pose a safety hazard.

In U.S. Pat. No. 5,067,666 there is disclosed a battery operated pill crusher comprising a selectively activatable motor to produce a power source to a cam-driven ram which reciprocates once on a vertical axis into and out of engagement with a pill in a medication cup with sufficient force to “smash” the pill. The ram is returned to its uppermost position by the coaction of the eccentric cam and a compression spring operatively circumscribed thereabout. However, this prior device has the disadvantage that the ram does not rotate while being displaced, so that the crushing abilities which can be exerted on the pill are limited. Another disadvantage of this prior device is the use of a compression spring to retract the plunger, which may weaken its ability to retract the plunger over time.

SUMMARY OF THE INVENTION

According to the present invention, there is provided a pill crusher which comprises a paper cup receptacle having an upwardly open, frusto-conical recess for receiving a paper cup, a plunger having a frusto-conical shape complimentary to that of the recess, the plunger being above and coaxial with the recess, an electric motor and a reciprocatory drive transmission between the electric motor and the plunger.

In a preferred embodiment of the present invention, the reciprocatory drive transmission comprises a worm and nut drive transmission, and a drive control is connected to the electric motor which comprises means for energizing the motor so as to displace the plunger into and out of the recess.

When the pill crusher according to the present invention is in operation, a paper cup is inserted into the receptacle, at least one pill is inserted into the paper cup and preferably, a second paper cup is inserted into the first paper cup, so that the pill or pills is/are located between the two paper cups in order to prevent cross-contamination. The electric motor is then energized under the control of the drive control so as to displace the plunger into the second paper cup and the recess in the receptacle until reaching a first predetermined distance or a predetermined pressure, which is sufficient to ensure that the pill is broken into segments or crushed. During this stroke, the plunger is rotated by the worm and nut drive, so that the pill is subjected to both rotational forces and compression forces, and the pill is broken into segments or crushed, the plunger terminating its downward movement at a distance from the bottom of the recess or at the predetermined pressure. The plunger is subsequently displaced from the pill, under the control of the drive control, and may be again displaced toward the pill through a second predetermined stroke to break the pill or pills into smaller segments. During this second predetermined stroke, the plunger is again rotated by the worm and nut drive transmission. The plunger is subsequently again displaced from the pill segments, under the control of the drive control, and may be again displaced toward the pill through a third predetermined stroke to ensure that each pill is pulverized by crushing and grinding into a fine powder. During this third stroke, the plunger is again rotated by the worm and drive transmission.

Preferably an undersurface of the plunger and a bottom surface of the recess are both dimpled in order to promote effective crushing and pulverization of the pill.

DESCRIPTION OF THE DRAWINGS

The present invention will be more readily understood from the following description of a preferred embodiment thereof given, by way of example, with reference to the accompanying drawings (Note that the 'A' drawings, e.g., FIG. 2A, refer to the first embodiment and the 'B' drawings, e.g., FIG. 2B, refer to the second embodiment), in which:—

FIG. 3A(i) shows a view of gears taken in section along the line 3A(i)-3A(i) of FIG. 3A;

FIGS. 5A(i) and 5A(ii) show broken-away views in vertical cross-section of parts of the pill crusher of FIG. 1A;

FIGS. 5B(i) and 5B(ii) show broken-away views in vertical cross-section of parts of the pill crusher of FIG. 1B;

FIGS. 12A(i)-(iv) show flowcharts of subroutines followed by the circuit during the operation illustrated in FIG. 12A; and FIGS. 12B(i)-(iv) show flowcharts of subroutines followed by the circuit during the operation illustrated in FIG. 12B.

DETAILED DESCRIPTION OF THE INVENTION

Figure 1A:
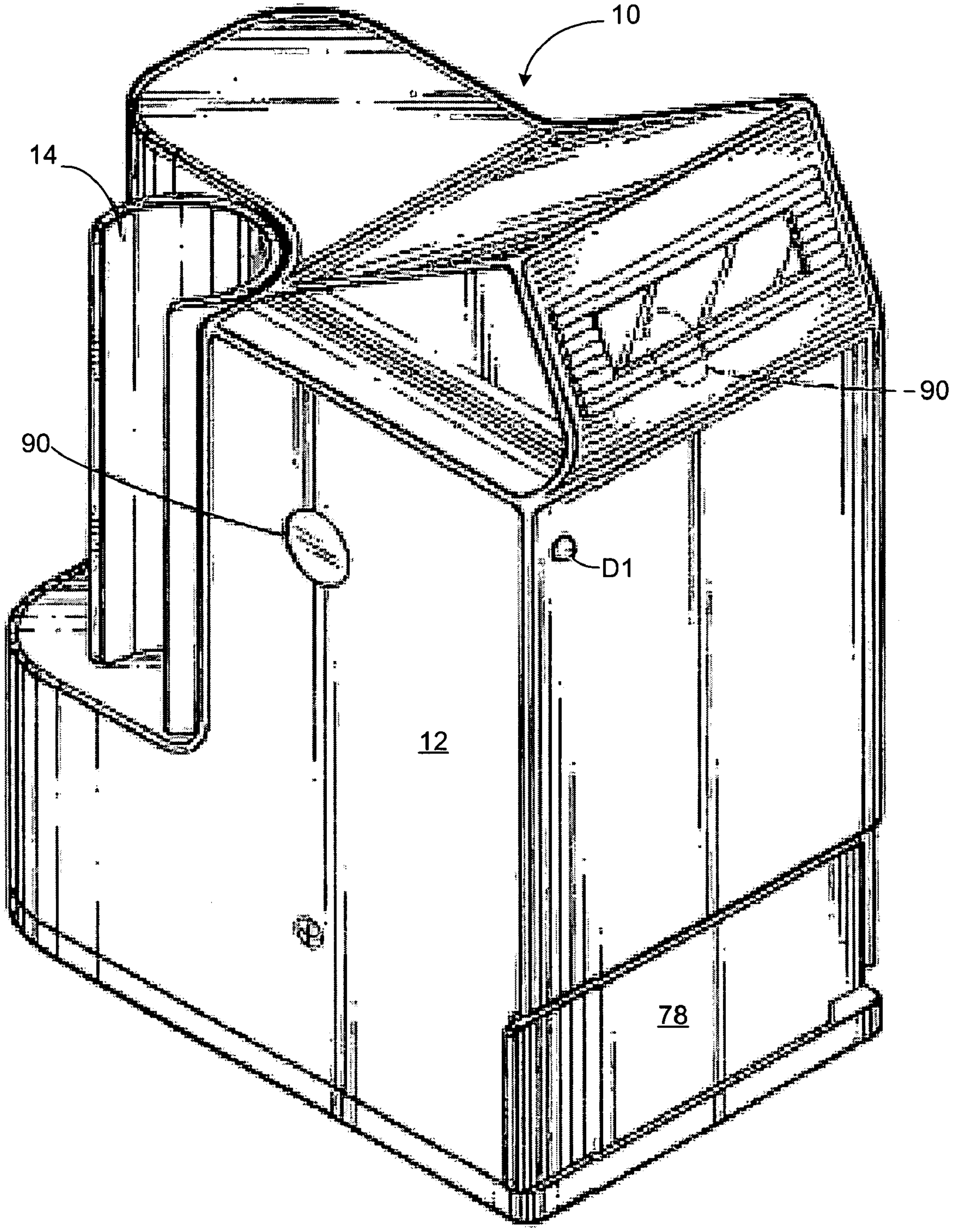
FIG. 1A shows a view in perspective of a pill crusher embodying the first embodiment of the present invention.
Figure 1B:
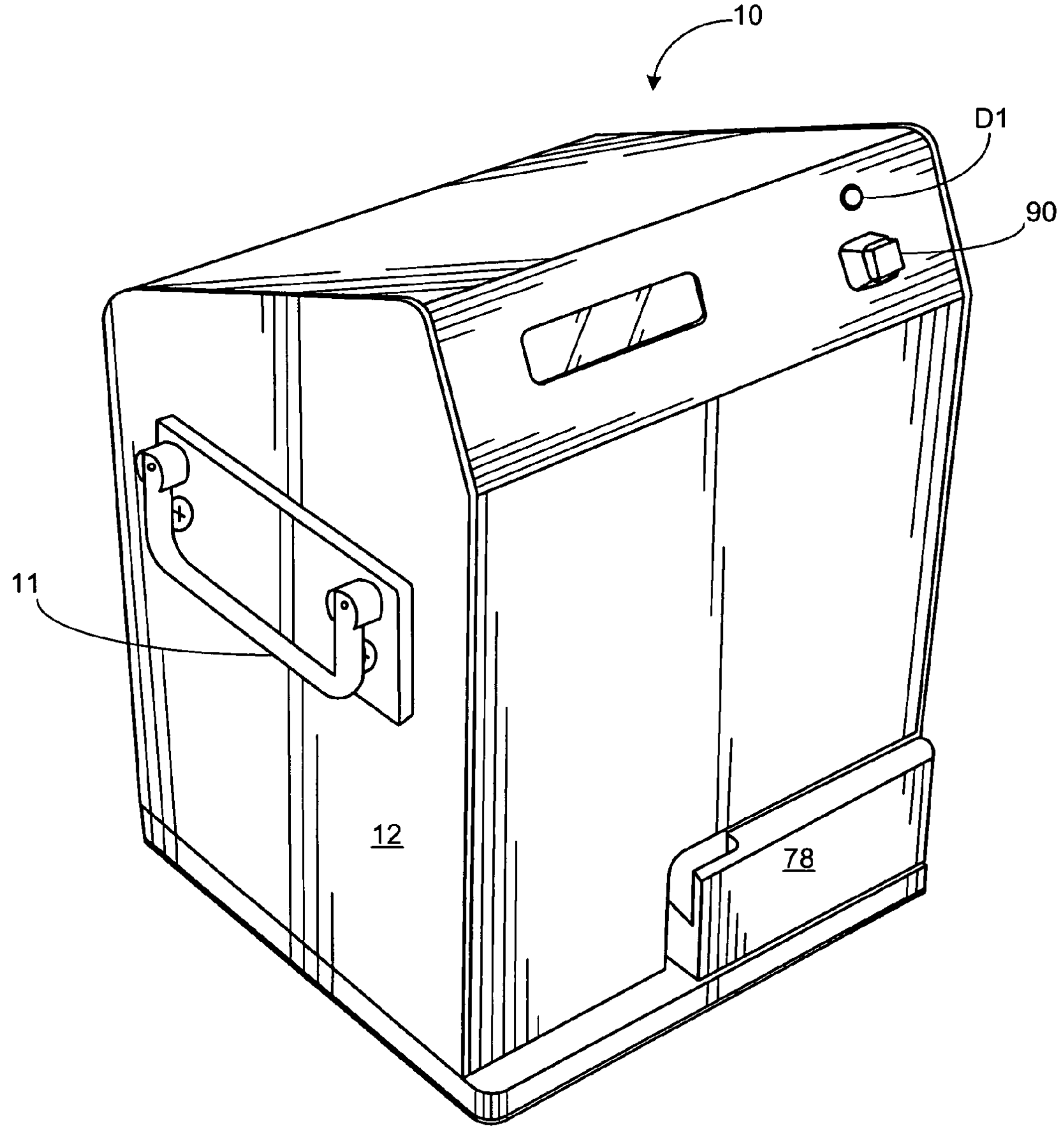
FIG. 1B shows a view in perspective of a pill crusher embodying the second embodiment of the present invention.

In FIGS. 1A and 1B, first and second embodiments, respectively, are shown of a pill crusher according to the invention, which is indicated generally by reference 10 and which has a housing 12. In FIG. 1A of the first embodiment there is shown a cylindrically-curved paper cup holder 14 at a rear corner of the housing 12. In FIG. 1B of the second embodiment there is shown a drop handle 11 on the side of the housing 12. There is also a second drop handle (not shown) located on the opposite side of the housing 12.

Figure 2A:
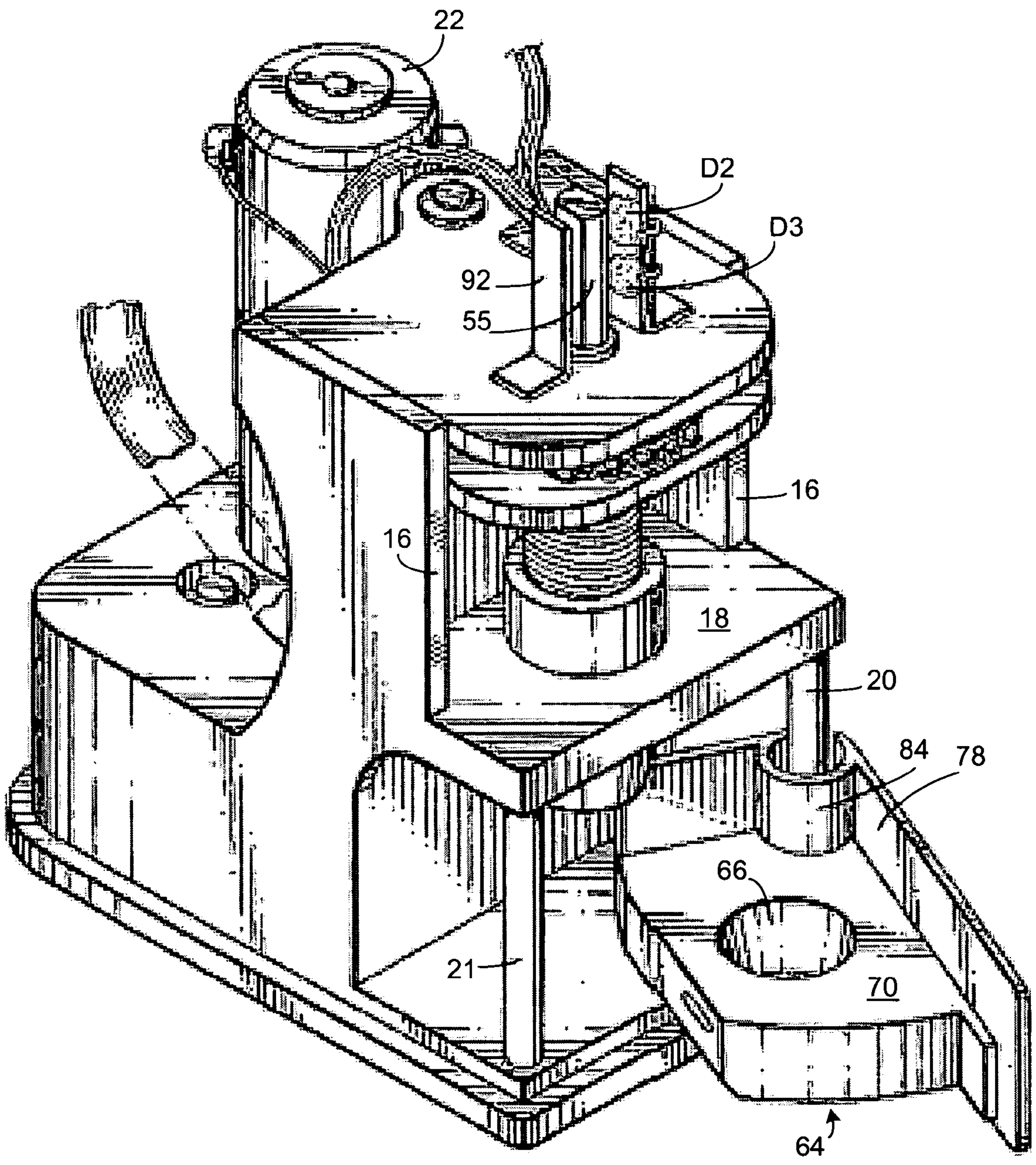
FIG. 2A shows a view in perspective of the pill crusher of FIG. 1A with a housing removed to show components in the interior of the pill crusher of FIG. 1A.
Figure 2B:
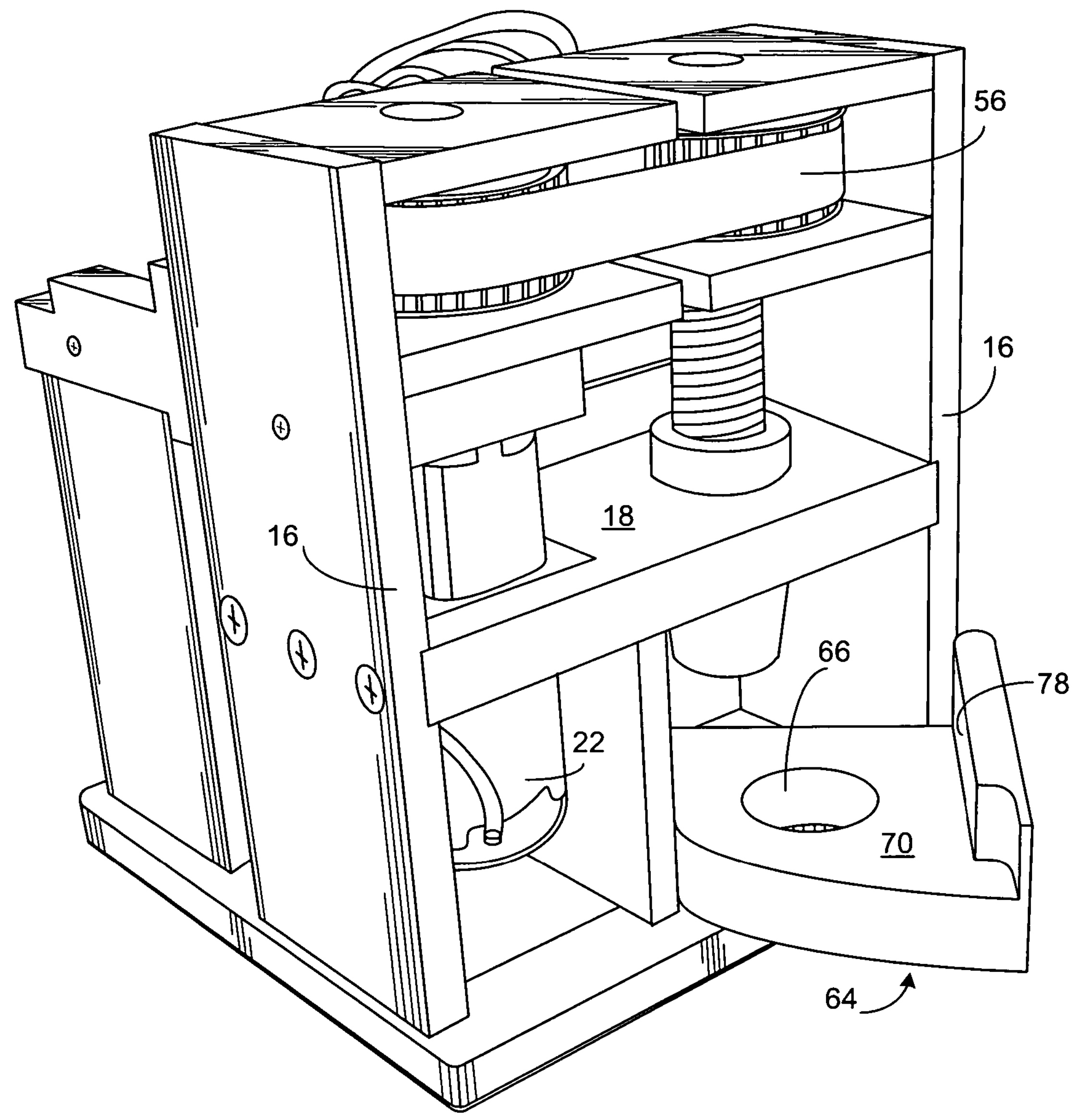
FIG. 2B shows a view in perspective of the pill crusher of FIG. 1B with a housing removed to show components in the interior of the pill crusher of FIG. 1B.

Referring now to FIGS. 2A and 2B, which show pill crusher 10 with housing 12 removed, it can be seen that the pill crusher has a pair of parallel vertical side walls 16, between which extends a platform 18.

In FIG. 2A of the first embodiment platform 18 projects forwardly from the side walls 16 and is supported on a pair of posts 20 and 21 at opposite front corners of the pill crusher. At the rear of the pill crusher, there is provided a low noise electric motor 22 (as seen in FIG. 3A) having a vertical axis.

Figure 3A:
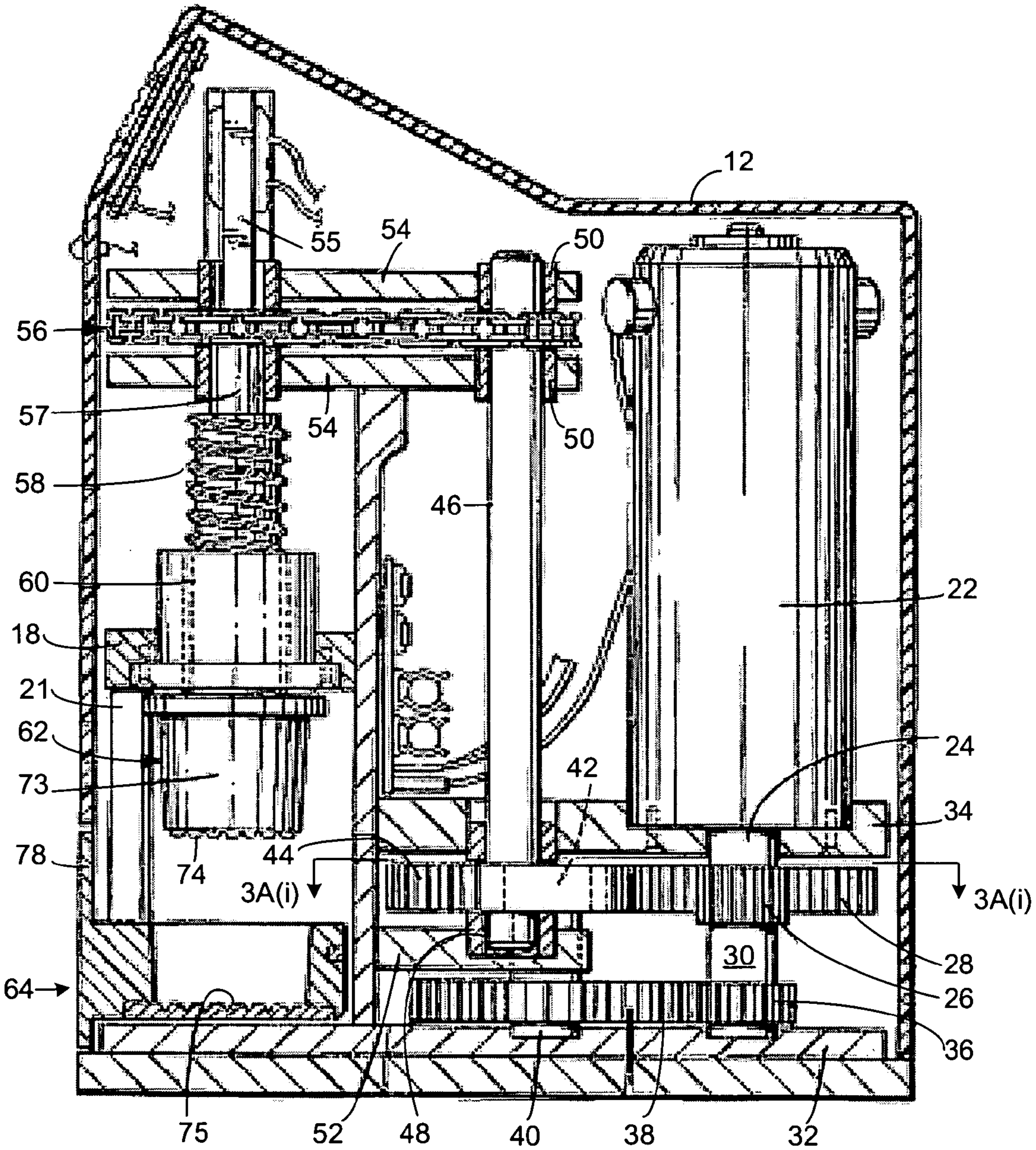
FIG. 3A shows a view taken in vertical cross-section through parts of the pill crusher of FIGS. 1A and 2A.
Figure 3A:
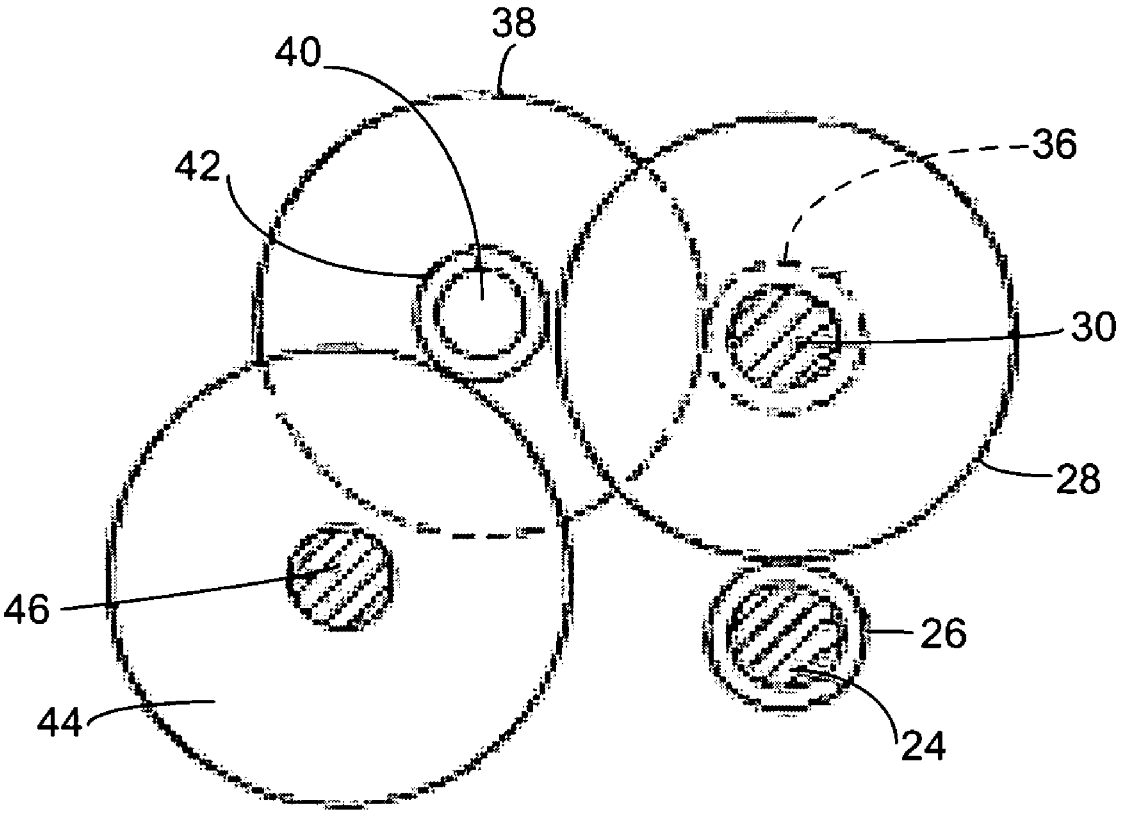
Figure 3B:
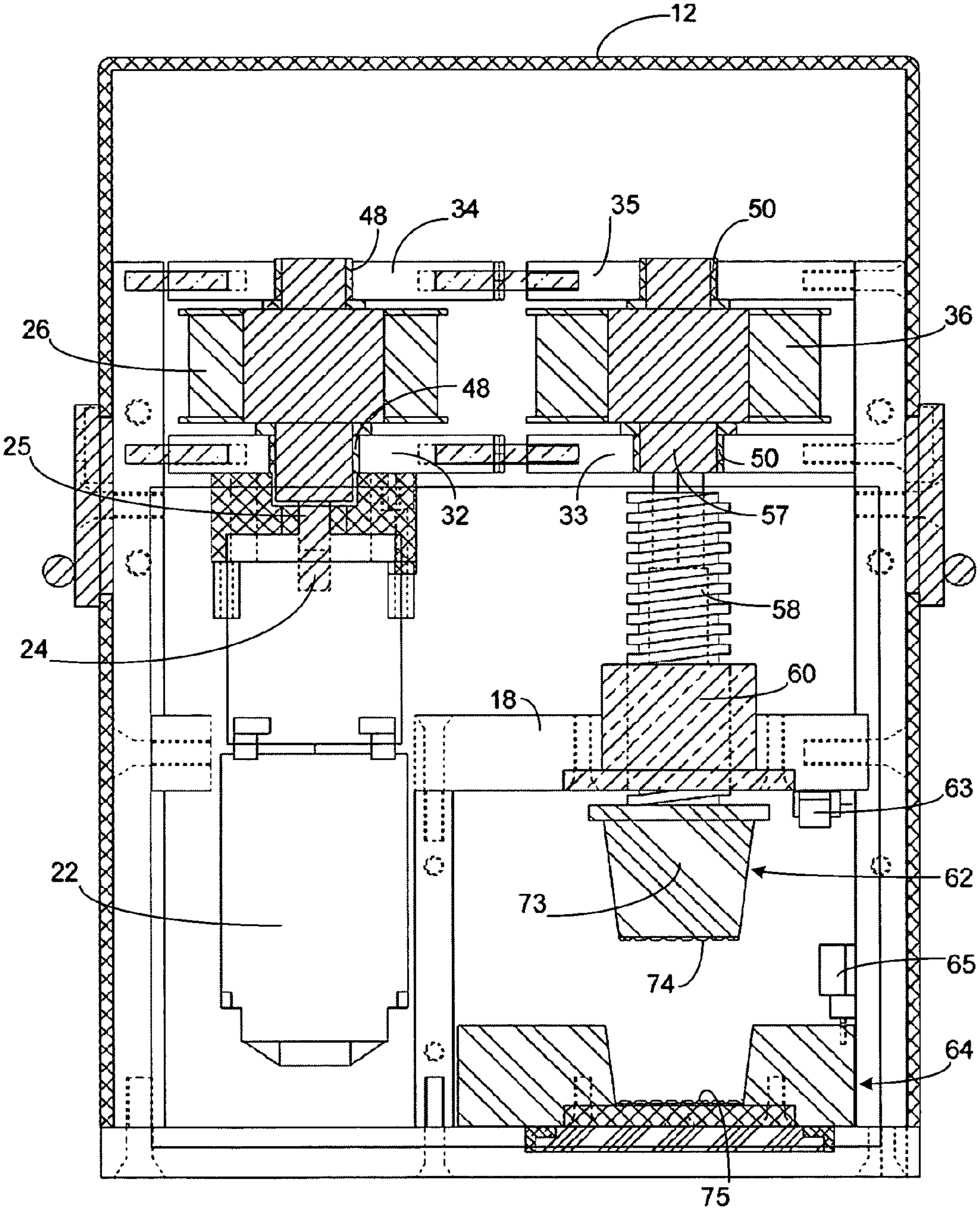
FIG. 3B shows a view taken in vertical cross-section through parts of the pill crusher of FIGS. 1B and 2B.

In FIG. 2B of the second embodiment there is provided a low noise electric motor 22 (as seen in FIG. 3B) having a vertical axis, at the front of the pill crusher.

As shown in FIGS. 3A and 3A(i) of the first embodiment, the electric motor 22 has a drive shaft 24, which carries a gear 26 meshing with a gear 28 mounted on a vertical shaft 30, which is journaled at its lower end in a base plate 32 and, at its upper end, in a platform 34 on which the motor 22 is mounted. A further gear 36 on the shaft 30 meshes with a gear 38 on a shaft 40, which is also journaled at opposite ends in the base plate 32 and platform 52. A gear 42 on the shaft 40 meshes, in turn, with a gear 44 mounted on the lower end of a vertical shaft 46. The shaft 46 is journaled at opposite ends in bearings 48 and 50. The bearings 48 are mounted in the platform 34 and 52 at the lower end of the shaft 46, and the bearings 50 are mounted in a pair of vertically spaced platforms 54, which extend between the side walls 16.

The upper end of the vertical shaft 46 is connected by a chain and sprocket drive, indicated generally by reference numeral 56, to a square-sectioned upper end portion 55 of a shaft 57 at the upper end of a worm gear 58, which has a vertical axis parallel to that of the shaft 46.

The worm gear 58 meshes with a threaded nut 60, which is fixed to the platform 18, and at its lower end carries a plunger which is indicated generally by reference numeral 62 and which is made of nylon or other suitable plastic material.

As shown in FIG. 3B of the second embodiment, the electric motor 22 has a drive input 24. Inserted into drive input 24 is a drive shaft 25, which carries a gear 26, which is journaled at opposite ends in bearings 48, which are mounted at its lower end in a base plate 32 on which the motor 22 is mounted and, at its upper end, in a platform 34. The gear 26 is connected by a grooved belt pulley drive 56 (as seen in FIG. 2B), to a second gear 36, which is journaled at opposite ends in bearings 50, which are mounted at its lower end in a base plate 33 and, at its upper end, in a platform 35. The gear 36 is carried on shaft 57 at the upper end of a worm gear 58, which has a vertical axis parallel to that of shaft 25.

The worm gear 58 meshes with a threaded nut 60, which is fixed to the platform 18, and at its lower end carries a plunger 62 which is made of stainless steel or other suitable metal material.

As shown in FIGS. 3A and 3B, the plunger 62 co-operates with a receptacle indicated generally by reference numeral 64, which is pivotally mounted on the post 20 as described in greater detail below.

Figure 4A:
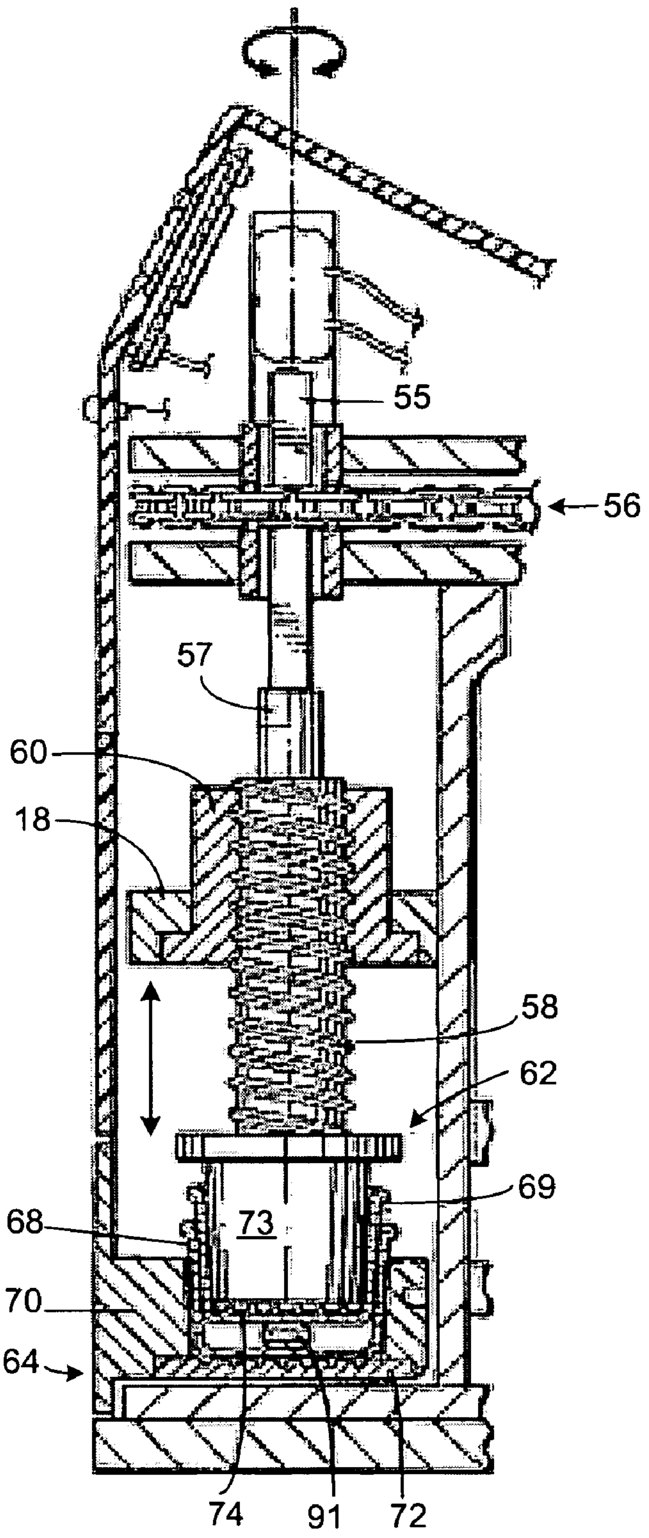
FIG. 4A shows a broken-away view, corresponding to parts of FIG. 3A, but with a plunger displaced downwardly from the position in which it is shown in FIG. 3A.
Figure 4B:
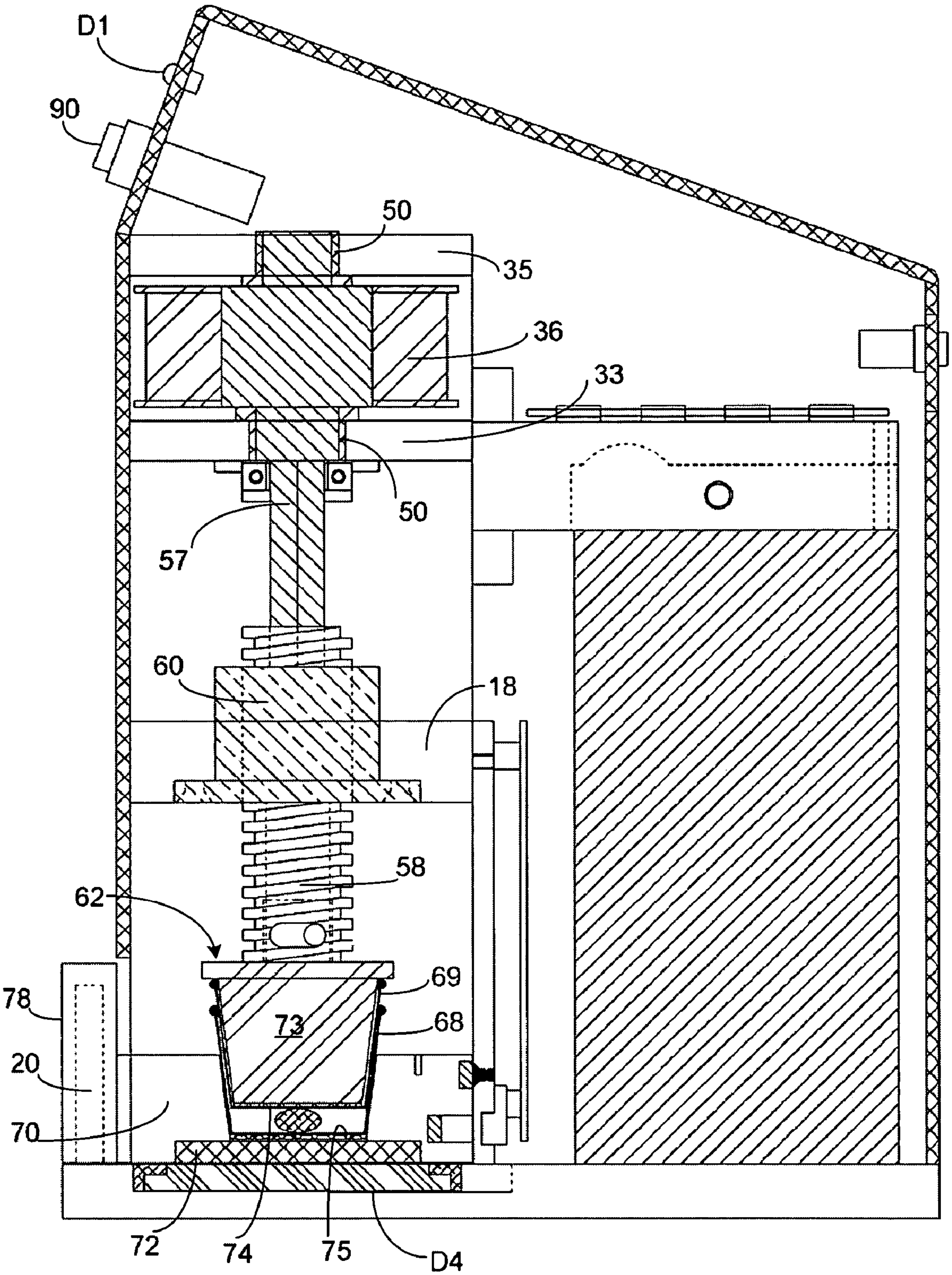
FIG. 4B shows a broken-away view, corresponding to parts of FIG. 3B, but with a plunger displaced downwardly from the position in which it is shown in FIG. 3B.

The receptacle 64 has an upwardly-open, frusto-conical recess 66 (as seen in FIGS. 2A and 2B), in which a pair of paper cups 68 and 69, are inserted one into the other (as seen in FIGS. 4A and 4B); a body portion 70, which forms the wall of the recess 66; and a circular plate 72, which is secured by screws (not shown) in the underside of the body portion 70 and which forms the bottom of the recess 66.

The plunger 62 has a frusto-conical surface 73, which is complementary in shape to the frusto-conical recess 66, and an undersurface 74. The undersurface 74 of the plunger 62 and the opposed upper surface 75 of the plate 72 forming the bottom of the recess 66 are both dimpled.

Figure 6A:
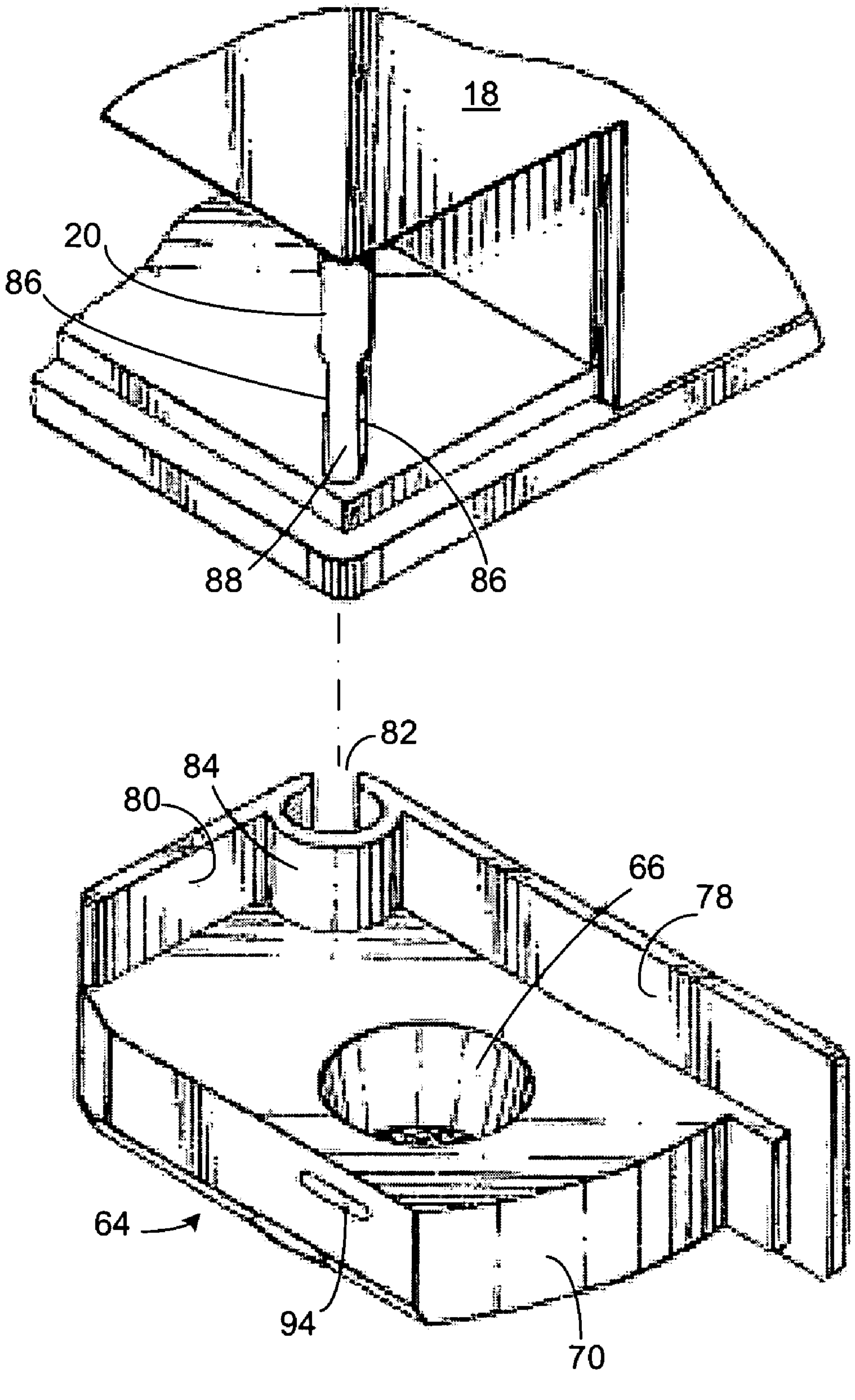
FIG. 6A shows a broken-away view in perspective of parts of the pill crusher of FIG. 1A.

Referring now to FIG. 6A of the first embodiment, the body 70 of the receptacle 64 has an upstanding front wall 78, an upstanding sidewall 80, which is spaced from the wall 78 by a gap 82, and a cylindrically curved wall 84 connecting inner surfaces of the walls 78 and 80.

A lower end 88 of the post 20 is formed with flat opposite sides 86 so as to enable the lower end 88 to slide through the gap 82 into and out of a cylindrical space within the curved wall 84. Normally, the lower end 88 of the post 20 is located within this cylindrical space, so that the cylindrical wall 84 and the lower end 88 of the post 20 form a readily releasable pivotal connection between the receptacle 64 and the pill crusher 10.

By pivoting the receptacle 64 about the post 20 into the relative positions in which they are shown in FIG. 6A of the first embodiment, the receptacle 64 can be released from the post 20 and, thus, from the pill crusher 10 to enable the receptacle 64 to be thoroughly cleaned.

Figure 6B:
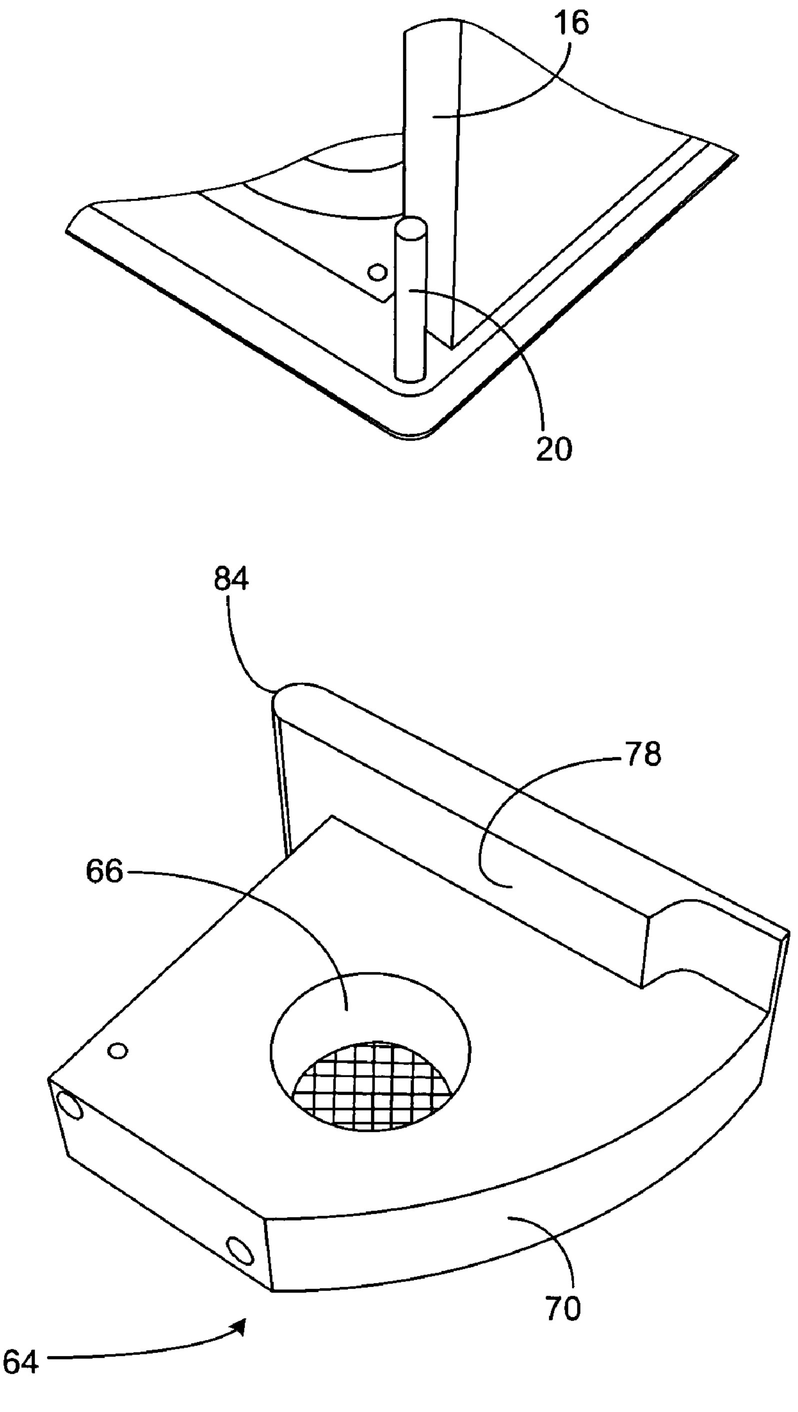
FIG. 6B shows a broken-away view in perspective of parts of the pill crusher of FIG. 1B.
Figure 7A:
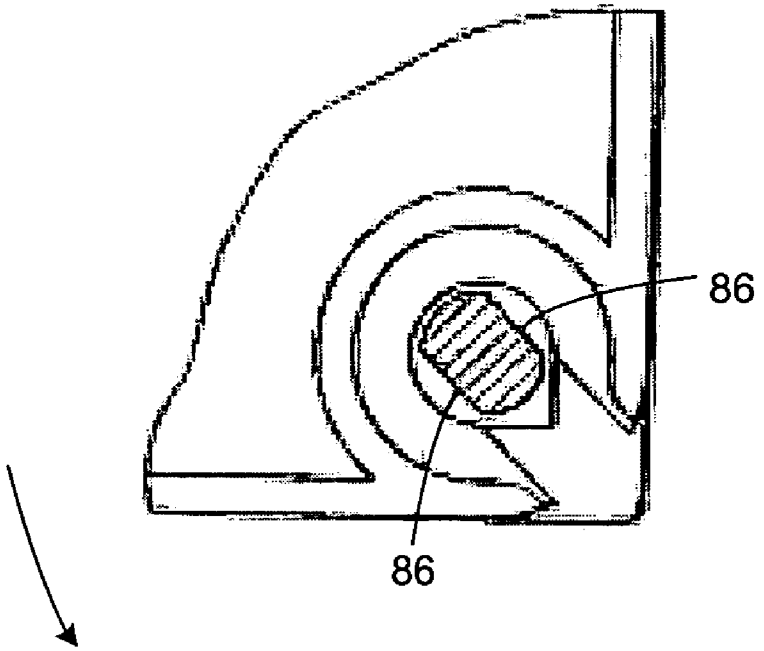
FIGS. 7A and 8A show broken-away views in horizontal cross-section through parts of the pill crusher shown in FIG. 1A.
Figure 8A:
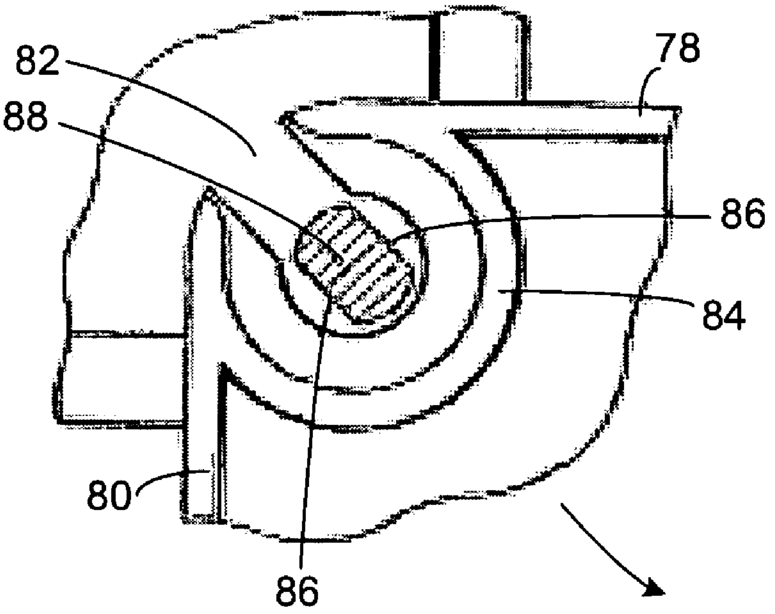
Figure 7B:
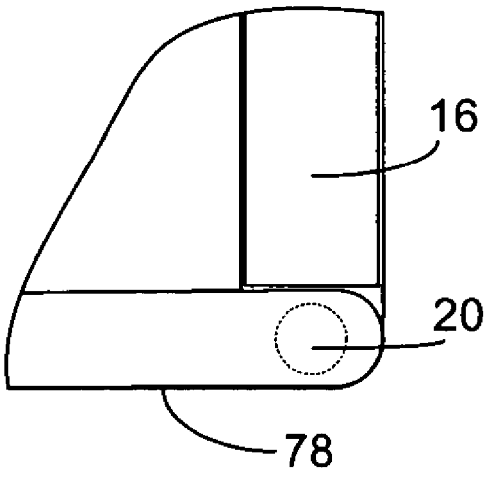
FIGS. 7B and 8B show broken-away views in horizontal cross-section through parts of the pill crusher shown in FIG. 1B.
Figure 8B:
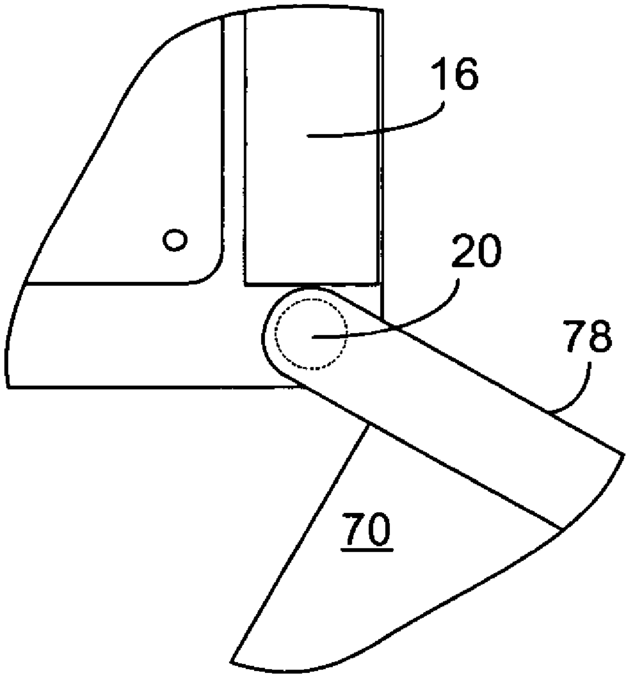

Referring now to FIG. 6B of the second embodiment, the body 70 of the receptacle 64 has an upstanding front wall 78, with a cylindrically curved end 84. An opening located on the undersurface of the upstanding front wall 78 at the cylindrically curved end 84 slides onto post 20 to form a readily releasable pivotal connection between the receptacle 64 and the pill crusher 10.

By pivoting the receptacle 64 about the post 20 into the relative positions in which they are shown in FIG. 6B of the second embodiment, the receptacle 64 can be released from the post 20 and, thus, from the pill crusher 10 to enable the receptacle 64 to be thoroughly cleaned.

In FIGS. 1A and 1B, the receptacle 64 is shown in its closed position, in which the body 70 of the receptacle 64, with the recess 66, is located within and concealed within the housing 12. By pivotation about the post 20, the receptacle 64 can be displaced into an opened position, in which it is shown in FIGS. 2A and 2B and in which the recess 66 is accessible at the exterior of the housing 12.

The walls 78 (and 80 in the first embodiment) close the opening in the housing 12 when the receptacle 64 is in its closed position during the crushing of the pill, and therefore airborne dust levels are reduced during the crushing operation and, also, the operator of the pill crusher 10 is prevented from inserting his or her fingers inside the housing 12.

While the pill crusher is in use, it can, for convenience, be mounted on the working surface of a medication cart, which is pushed from room to room by a nurse and used for preparing medications for administration to patients. For that purpose, the pill 91 is placed between the two paper cups 68 and 69, as seen in FIGS. 4A and 4B, in order to minimize contamination of the plunger 62. The pill is then pulverized, as described below, and the top cup 69 is then removed from the bottom cup 68 to allow the powder produced by the pulverization to be mixed with juice or food for consumption by the patient.

To initiate the grinding operation in the first embodiment, the operator is required to simultaneously press buttons 90 which are located at opposite sides of the housing 12. The operator is therefore required to use both hands to press these buttons 90, so that the operator's hands must be located away from the vicinity in which the crushing operation occurs. As a further safety measure, the electric motor 22 cannot be energized unless the receptacle 64 is in its closed position, in which the recess 66 is located below the plunger 62 and the opening in the housing 12, through which the receptacle 64 pivots between its closed and opened positions, is closed by the walls 78 and 80 of the receptacle 64, thereby preventing access to the interior of the housing 12 and, in particular, at the region of the plunger 62.

To initiate the grinding operation in the second embodiment, the operator is required to press button 90 which is located at the top of the front of the housing 12. As a safety measure, the electric motor 22 cannot be energized unless the receptacle 64 is in its closed position, in which the recess 66 is located below the plunger 62; and the opening in the housing 12, through which the receptacle 64 pivots between its closed and opened positions, is closed by the wall 78 of the receptacle 64, thereby preventing access to the interior of the housing 12 and, in particular, at the region of the plunger 62.

In the first embodiment, to ensure effective pulverization with the pill 91 located between the paper cups 68 and 69, the plunger 62 is first moved downwardly to initiate the crushing of the pill 91 as seen in FIG. 4A. The plunger 62 is then raised by a small distance, as seen in FIG. 5A(i), in which this distance has been exaggerated to facilitate the illustration of the operation, after which the plunger 62 is then twice lowered again, as seen in FIG. 5A(ii), and raised again, to pulverize the pill 91. As the plunger 62 is lowered, it is simultaneously rotated. Finally, the plunger is raised into a "Park" position, in which it is shown in FIG. 3A, to enable the paper cups 68 and 69 to be withdrawn from the pill crusher 10.

In the second embodiment, to ensure effective pulverization of the pill 91 located between the paper cups 68 and 69, the plunger 62 is moved downwardly to initiate the crushing of the pill 91 as seen in FIG. 4B. As the plunger 62 is lowered, it is simultaneously rotated. The plunger is raised into a "Park" position, in which it is shown in FIG. 3B, to enable the paper cups 68 and 69 to be withdrawn from the pill crusher 10.

The grinding of the pill is promoted by the rotation of the plunger 62 and by the dimpling of the opposed surfaces of the bottom of the receptacle 64 and the underside of the plunger 62.

Figure 9A:
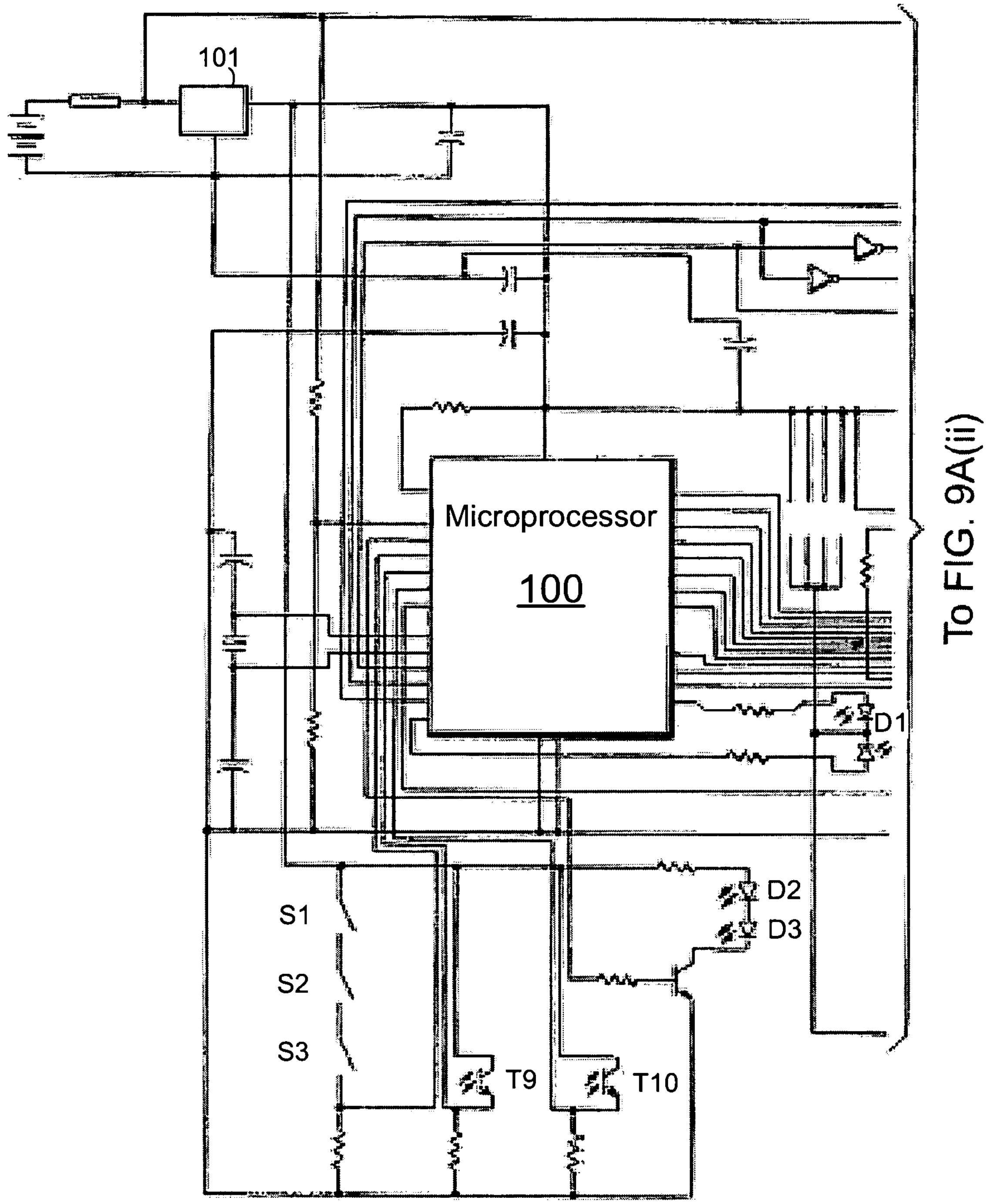
FIGS. 9A(i) and 9A(ii) show circuit diagrams of a control unit in the pill crusher of FIG. 1A.

The operation of the first embodiment of the pill crusher 10 is controlled by a control circuit shown in FIGS. 9A(i) and 9A(ii), which includes a microprocessor 100 which is a PIC 16 F 870 microprocessor sold by Microchip Corporation, a voltage regulator 101 and a LCD 102 provided with a negative voltage generator 104. Through gates G1, G2 and G3, and through an H-circuit comprising transistors T1-T6, the microprocessor 100 controls operation of the motor 22, as described below.

When this circuit is energized by connection to its battery, the microprocessor 100 performs the routine shown in FIG.

10A of the first embodiment by setting up its internal functions and then initializing the LCD 102, which then displays the word "INITIALIZING".

LEDs T9 and T10 are then energized. The LEDs T9 and T10 are provided on a post 92 (as seen in FIG. 2A) and co-operate with a pair of photodiodes D2 and D3 for sensing the vertical position of the top of the shaft, the photodiodes D2 and D3 being provided on a post 93 parallel to the post 92.

If the plunger 62 is not in its fully raised or "rest" position, the motor 22 is energized to raise the plunger 62 into this position.

After a one-second delay, a bicolour LED D1, which is visible at the front of the housing 12, is changed to green, and the LCD 102 displays the word "READY".

Figure 11A:
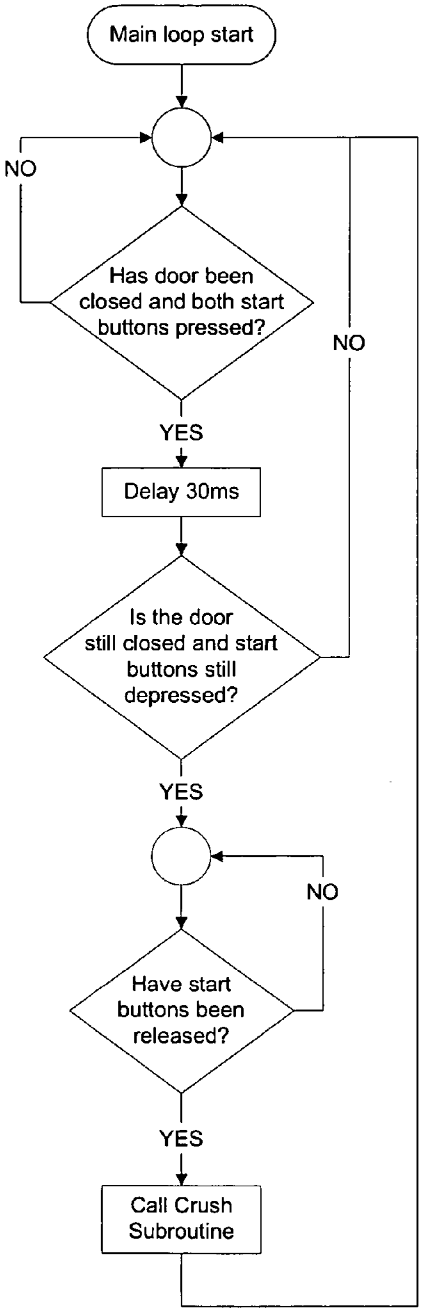
FIG. 11A shows a flowchart of a routine followed by the circuit prior to operation of the pill crusher of FIG. 1A.

The microprocessor 100 then cycles through the loop shown in FIG. 11A until the pill crusher is operated.

When the pill 91 is inserted with the paper cups 68 and 69 into the receptacle 64, the receptacle 64 must be moved into its closed position, in which it closes a magnetically operated switch S3, to prevent access to the interior of the housing 12 and to counteract the escape of dust from the housing during the crushing of the pill 91.

The operator then presses the two buttons 90 on opposite sides of the housing 12 to close switches S1 and S2, which are connected in series with the switch S3.

Figure 12A:
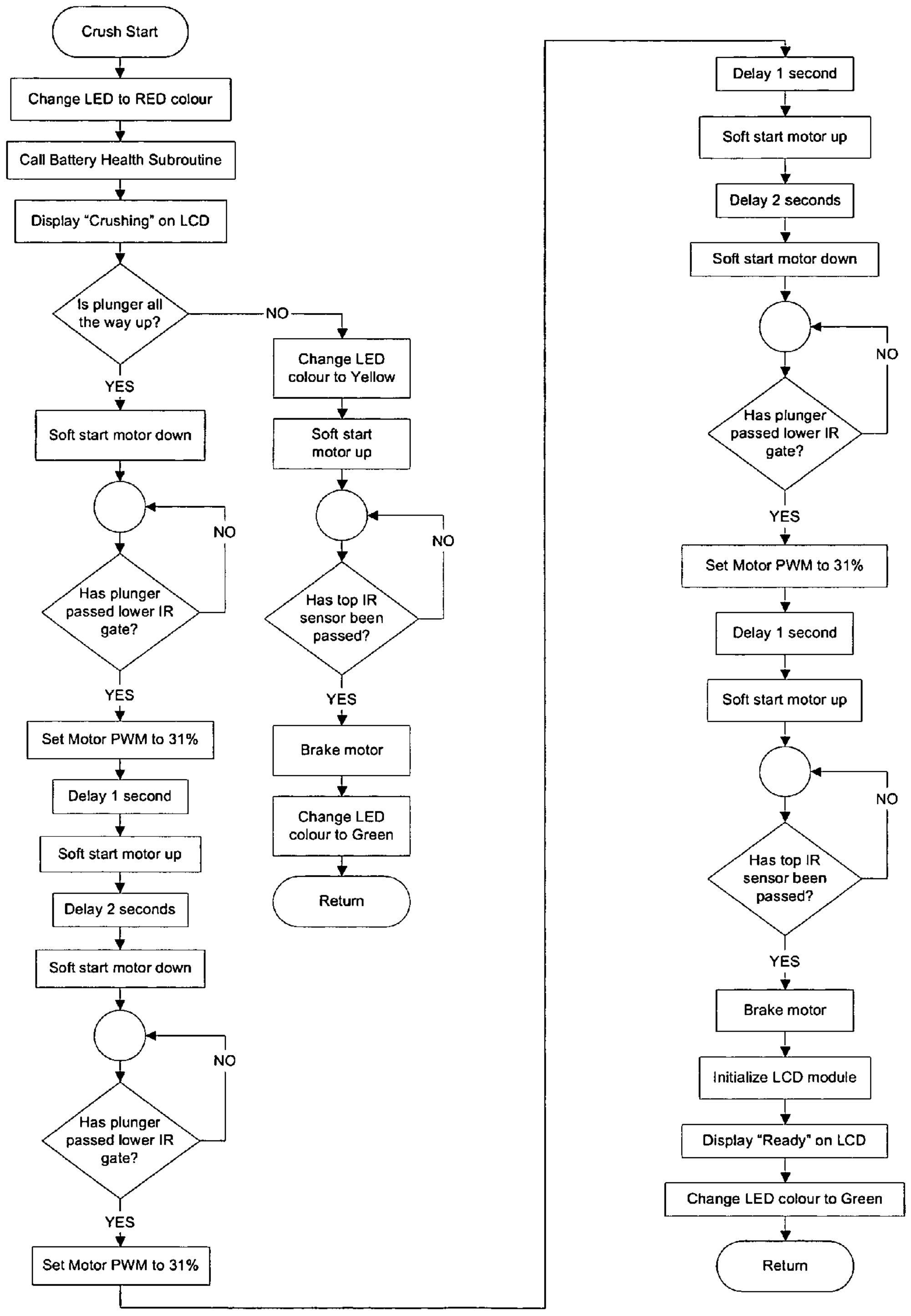
FIG. 12A shows a flowchart of a routine followed by the circuit during operation of the pill crusher of FIG. 1A.

The closure of the three switches S1-S3 initiates the routine shown in FIG. 12A of the first embodiment by changing the LED D1 to red and performing a battery health routine, illustrated in FIG. 12A(iv), to ensure that the voltage of the battery remains sufficiently high.

The LED 102 is then changed to display the word "CRUSHING" and the vertical position of the plunger 62 is then checked as described above.

If the plunger 62 is not in its fully raised position, the LED D1 is changed to yellow, the motor 22 is started with a soft start as shown by the subroutine of FIG. 12A(ii) and the plunger 62 is raised to the fully raised position, the subroutine of FIG. 12A(i) being employed to brake the motor 22. The LED D1 is then changed back to green.

With the plunger 62 located in its fully raised position, the motor 22 is energized by a soft start as illustrated in the subroutine of FIG. 12A(iii), to move the plunger downward, as described above, to initiate the crushing of the pill.

When the photodiode D3 senses that the plunger 62 has reached its lower position, the subroutine of FIG. 12A(ii) is again initiated, after a one-second delay, to raise the plunger 62.

As shown in FIG. 12A, the plunger 62 is then lowered and raised again twice, so that the pill 91 is pulverized by three downward strokes of the plunger 62.

However, it has been found that in some cases, two downward strokes of the plunger 62 are sufficient, and the programming of the microprocessor 100 can be readily modified to omit one of the three strokes.

When the crushing of the pill has been completed, the LCD 102 is changed to display the word "READY" again, and the LED D1 is again changed to green.

Figure 9B:
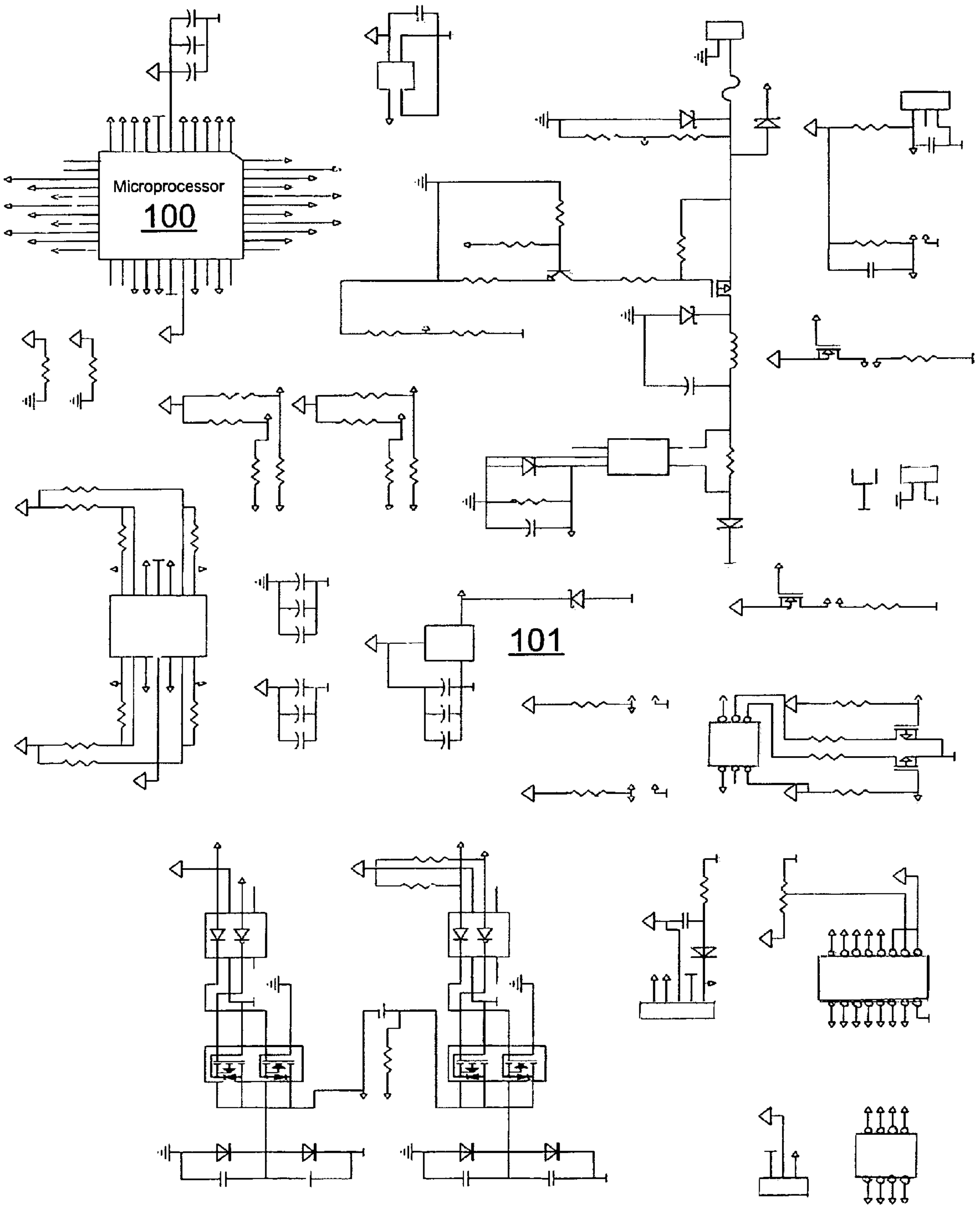
FIGS. 9B(i), 9B(ii) and 9B(iii) show circuit diagrams of a control unit in the pill crusher of FIG. 11B.
Figure 10A:
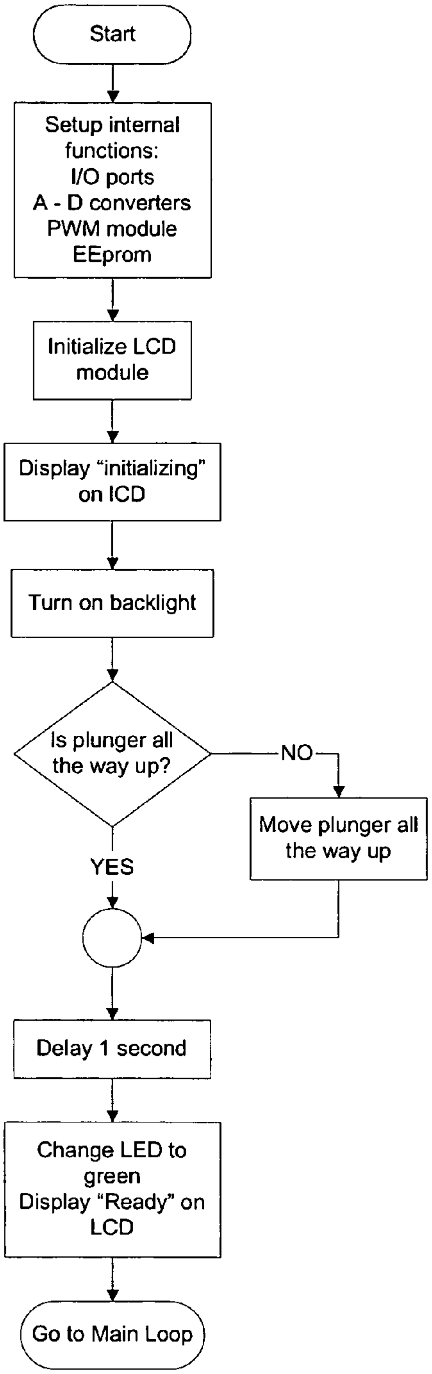
FIG. 10A shows a flowchart of a routine followed by the circuit of FIGS. 9A(i) and 9A(ii) when the circuit is powered up.

The operation of the second embodiment of the pill crusher 10 is controlled by a control circuit shown in FIGS. 9B(i), 9B(ii), and 9B(iii), which includes a microprocessor 100 which is a PIC 18 F 458 microprocessor sold by Microchip Corporation, a voltage regulator 101 and a LCD 102. Through the motor control board (as seen in FIG. 9B(ii)), which consists of a H-Bridge controller, power MOSFETs, and related discrete components, the microprocessor 100 controls operation of the motor 22, as described below.

Figure 10B:
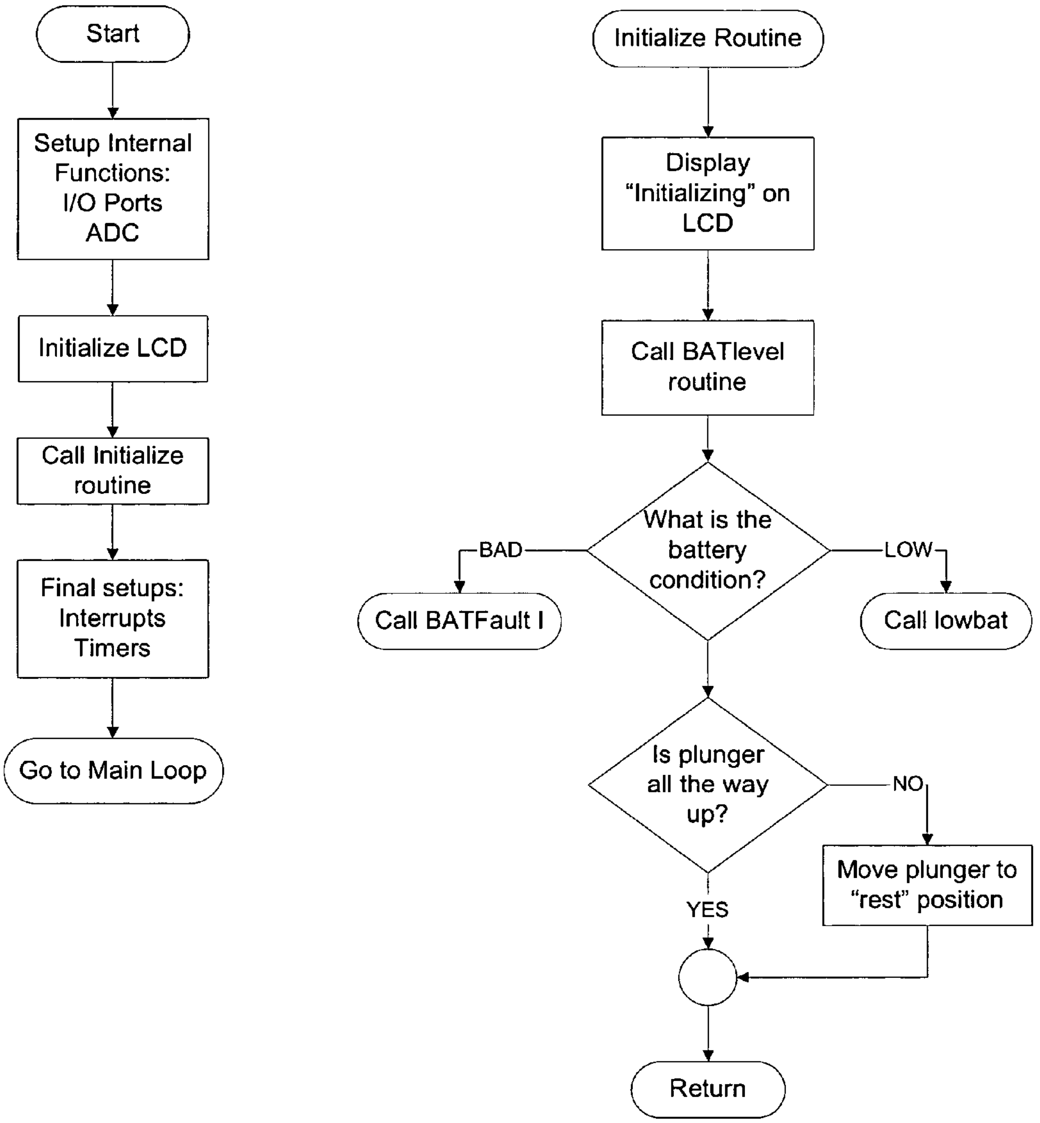
FIG. 10B shows a flowchart of a routine followed by the circuit of FIGS. 9B(i), 9B(ii), and 9B(iii) when the circuit is powered up.

When this circuit is energized by connection to its battery, the microprocessor 100 performs the routine shown in FIG. 10B by setting up its internal functions and then initializing the LCD 102, which then displays the word "INITIALIZING".

The photo-reflective infrared sensor 63 is then energized which allows the detection of the position of the plunger. If the plunger 62 is not in its fully raised or "rest" position, the motor 22 is energized to raise the plunger 62 into this position.

Figure 12B:
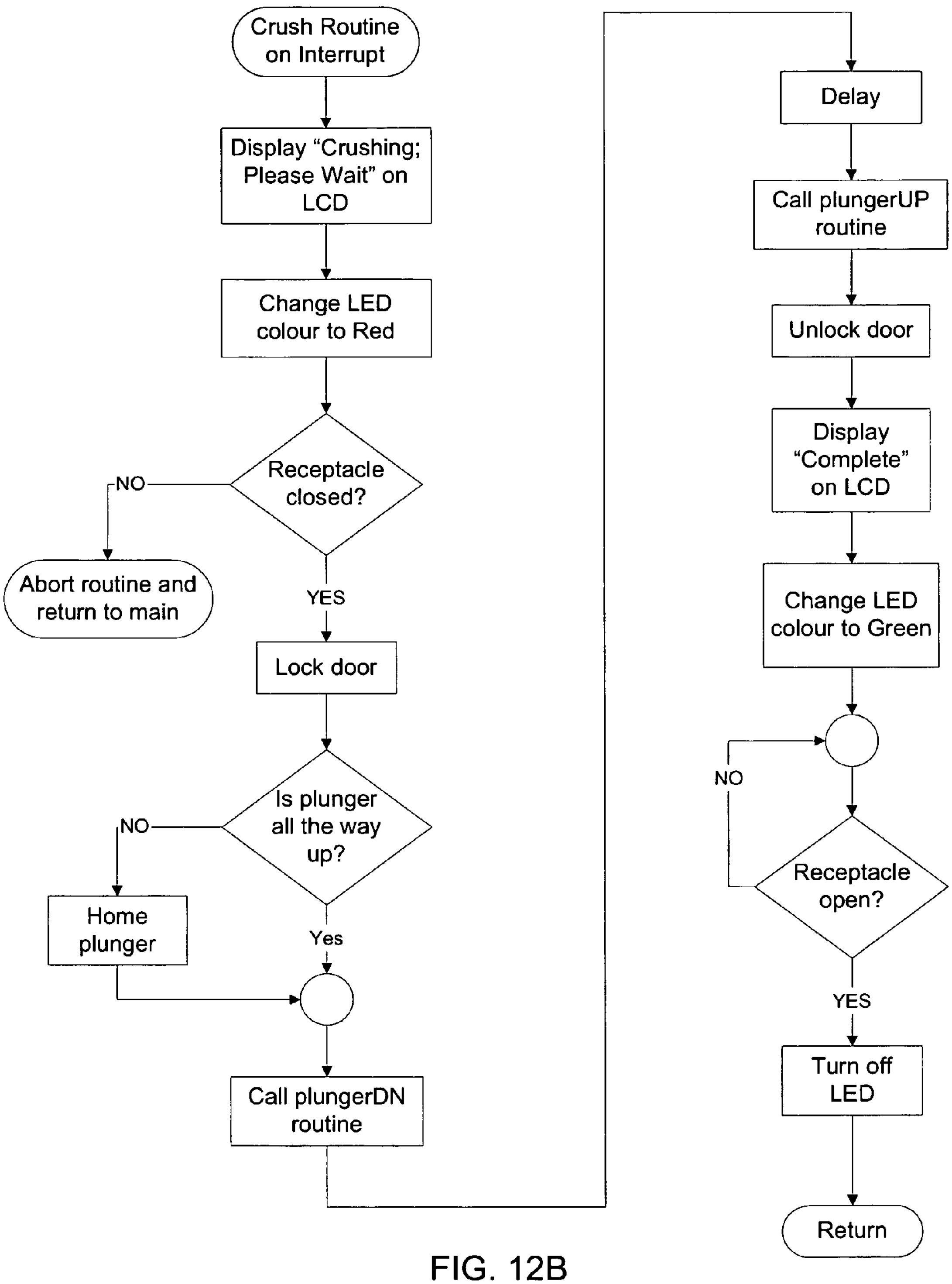
FIG. 12B shows a flowchart of a routine followed by the circuit during operation of the pill crusher of FIG. 1B.
Figure 12B:
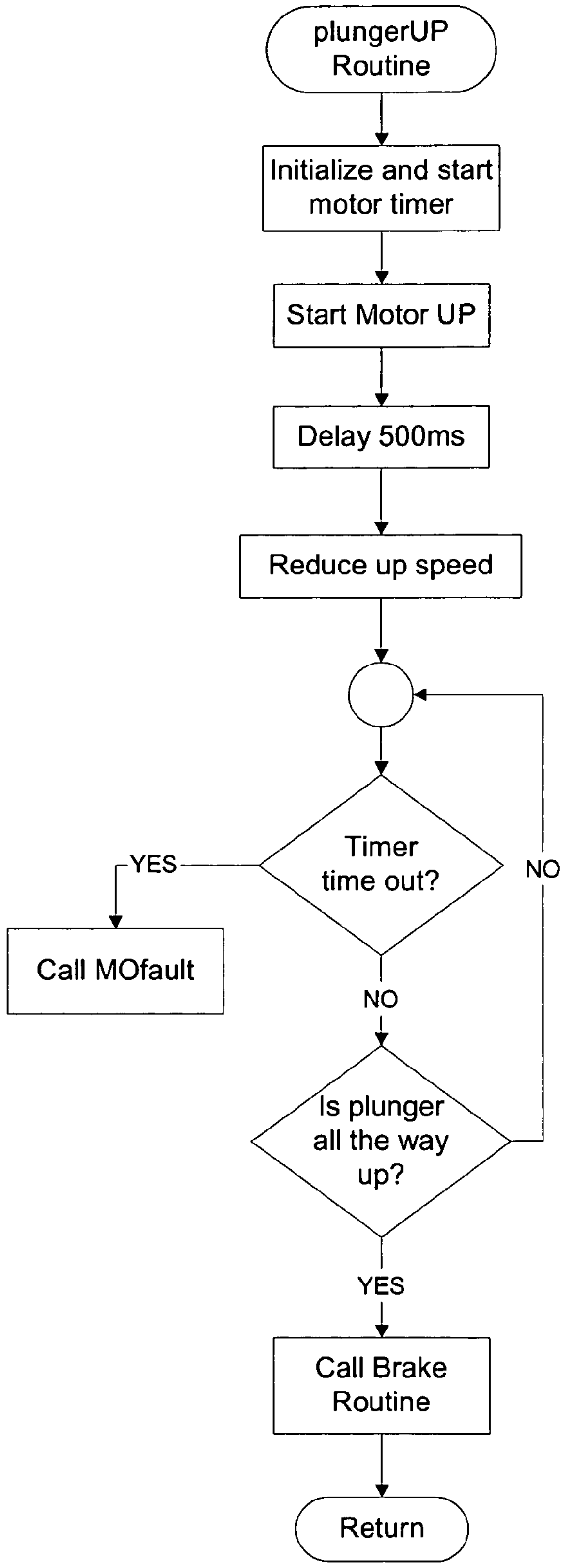

After a one-second delay, a bicolour LED D1, which is visible at the front of the housing 12, is changed to green, and the LCD 102 displays the word "READY" as shown by the subroutine in FIG. 12B(iv), and also displays the battery power with the words "BATTERY: xx %" as shown by the subroutine in FIG. 12B(iii), where 'xx %' equals '100%', '75%', '50%', or '25%'.

Figure 11B:
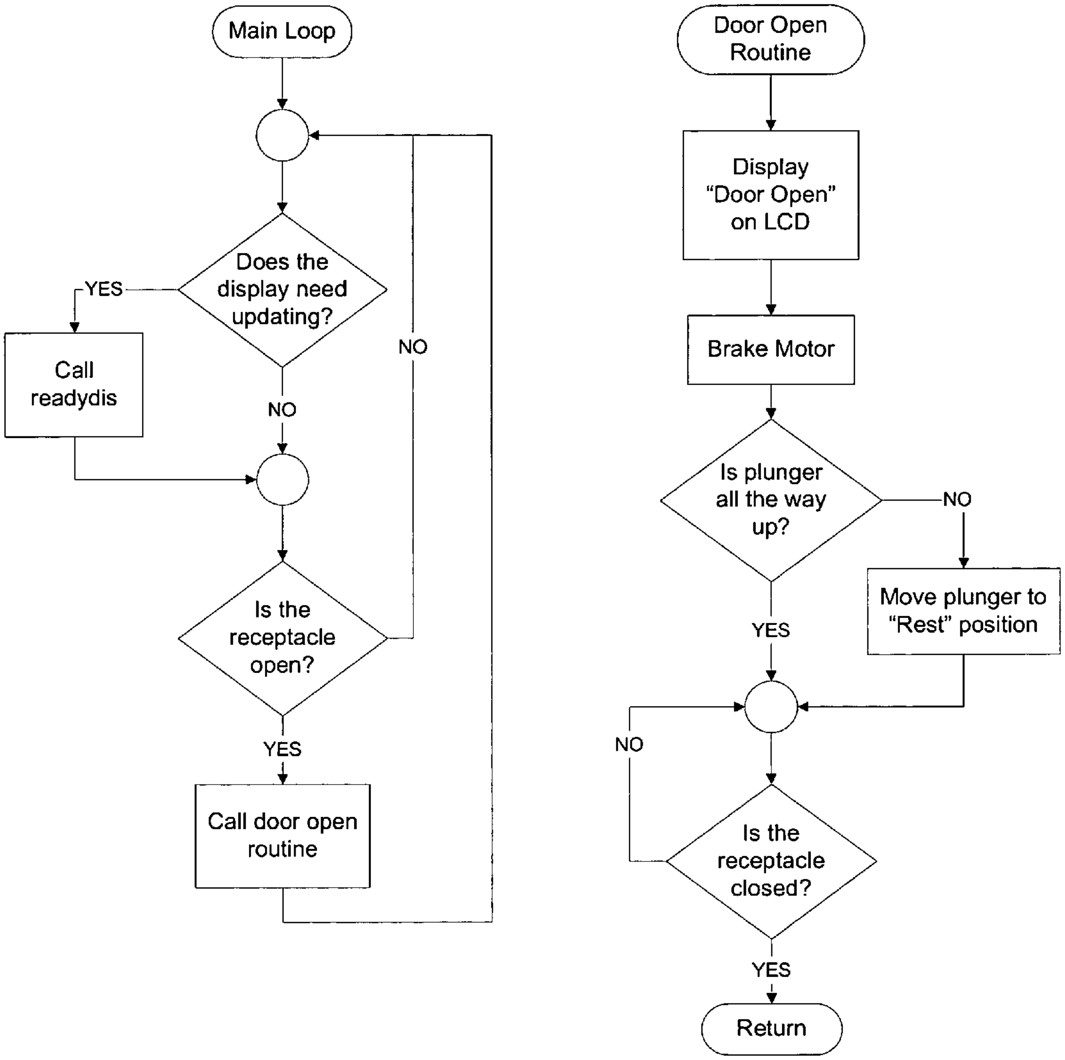
FIG. 11B shows a flowchart of a routine followed by the circuit prior to operation of the pill crusher of FIG. 1B.

The microprocessor 100 then cycles through the loop shown in FIG. 11B until the pill crusher is operated.

When the pill 91 is inserted with the paper cups 68 and 69 into the receptacle 64, the receptacle 64 must be moved into its closed position, in which it closes a magnetically operated switch S2, to prevent access to the interior of the housing 12 and to counteract the escape of dust from the housing during the crushing of the pill 91.

The operator then presses the button 90 on the top of the front of the housing 12 to close switch S1.

The closure of the switch S1 initiates the routine shown in FIG. 12B by changing the LED D1 to red. The LED 102 is then changed to display the words "CRUSHING; PLEASE WAIT" and the receptacle 64 is verified to be in the closed position, and if so, the door lock solenoid 65 is energized to lock the receptacle 64 into position and prevent opening. If the receptacle 64 has been moved to the open position, the crushing sequence is halted, and the LCD 102 is changed to display "DOOR OPEN". Only when the receptacle 64 is in the closed position will the crushing sequence be allowed to begin again.

Upon the success of the above operations, the vertical position of the plunger 62 is then checked as described above. If the plunger 62 is not in the raised position, a homing sequence is initiated to bring the plunger 62 into position.

With the plunger 62 located in its fully raised position, the motor 22 is energized by a plunger down routine as illustrated in the subroutine of FIG. 12B(ii), to move the plunger downward, as described above, to initiate the crushing of the pill.

When the pressure sensor D4 (as seen in FIG. 4B) senses that the plunger 62 has reached the first predetermined pressure, the motor 22 is energized by a plunger up routine as illustrated in the subroutine of FIG. 12B(i), after a one-second delay, to raise the plunger 62.

When the crushing of the pill has been completed, the LCD 102 is changed to display the word "COMPLETE", and the LED D1 is again changed to green.

Although the particular preferred embodiments of the invention have been disclosed in detail for illustrative purposes, it will be recognized that variations or modifications of the disclosed apparatus lie within the scope of the present invention.

The invention claimed is:

1. A pill crusher, comprising:

a paper cup receptacle having an upwardly open, frusto-conical recess for receiving a paper cup;

a plunger having a frusto-conical shape complimentary to that of the recess, the plunger being above and coaxial with the recess;

an electric motor;

a reciprocating worm and nut drive transmission between the electric motor and the plunger for rotating the plunger while displacing the plunger into and out of the recess; and first and second actuators, said first and second actuators positioned on opposite sides of a housing, said first and second actuators actuating said plunger when both first and second actuators are actuated.

2. A pill crusher as claimed in claim 1, including a drive control connected to the electric motor, the drive control comprising means for energizing the motor so as to displace the plunger into and from the recess.

3. A pill crusher as claimed in claim 1, wherein the plunger has a dimpled undersurface, having a plurality of dimples, facing the recess and the recess has a dimpled bottom surface having a plurality of dimples, facing the plunger.

4. A pill crusher as claimed in claim 1, further comprising a connection securing the receptacle to the pill crusher and allowing displacement of the receptacle relative to the housing between a closed position within the housing and beneath the plunger and an open position in which the recess is accessible at the exterior of the housing.

5. A pill crusher as claimed in claim 4, wherein the connection is a pivotal connection.

6. A pill crusher as claimed in claim 5, wherein the connection is releasable to allow removal of the receptacle from the pill crusher.

7. A pill crusher as claimed in claim 4, wherein the housing has an opening through which the receptacle moves between its opened and closed positions and the receptacle fits into and closes the opening when the receptacle is in its closed position.

8. A pill crusher as claimed in claim 4, including a switch enabling the energization of the electric motor only when the receptacle is in the closed position.

9. A pill crusher as claimed in claim 1, wherein the displacement of the plunger into the recess is ceased by a pressure sensor located under the receptacle, said pressure sensor sensing when said pressure has caused a predetermined pressure on said receptacle.

10. A pill crusher as claimed in claim 1, wherein on actuation of said first and second actuator, said plunger is rotated and displaced a first time in said recess, then said plunger is raised a distance, then said plunger is displaced to said recess a second time.

* * * * *